(12) United States Patent
Ng et al.

(10) Patent No.: US 12,511,017 B2
(45) Date of Patent: Dec. 30, 2025

(54) GENERATING DYNAMIC USER SPECIFIC APPLICATION FUNCTION SETUP INTERFACES

(71) Applicant: Chime Financial, Inc., San Francisco, CA (US)

(72) Inventors: Daniel Ng, Redwood City, CA (US); Andrew Ratcliffe, San Francisco, CA (US); Grace Hayes-Larson, Kirkland, WA (US); Jeff Feng, San Francisco, CA (US); Joanna Chao, Santa Cruz, CA (US); Justin Wienckowski, San Francisco, CA (US); Kyle Daley, Incline Village, NV (US); Xiangyu Ji, Sunnyvale, CA (US)

(73) Assignee: Chime Financial, Inc., San Francisco, CA (US)

( * ) Notice: Subject to any disclaimer, the term of this patent is extended or adjusted under 35 U.S.C. 154(b) by 244 days.

(21) Appl. No.: 18/299,895

(22) Filed: Apr. 13, 2023

(65) Prior Publication Data
US 2024/0345700 A1    Oct. 17, 2024

(51) Int. Cl.
*H04M 1/72448* (2021.01)
*G06F 3/0482* (2013.01)
(Continued)

(52) U.S. Cl.
CPC ...... *G06F 3/0482* (2013.01); *H04M 1/72448* (2021.01); *H04M 1/72469* (2021.01); *G06Q 40/02* (2013.01)

(58) Field of Classification Search
CPC ............ G06F 3/0482; H04M 1/72448; H04M 1/72469; G06Q 40/02
See application file for complete search history.

(56) References Cited

U.S. PATENT DOCUMENTS

2016/0291844 A1* 10/2016 Lai ........................ G06Q 20/10
2019/0384460 A1* 12/2019 Harnisch ................. G06F 9/453
(Continued)

OTHER PUBLICATIONS

"iPhone User Guide: Setup Basics" webpage <https://support.apple.com/guide/iphone/setup-basics-iph9374b7411/ios> 2 pages, retrieved May 2, 2023.

*Primary Examiner* — KC Chen
(74) *Attorney, Agent, or Firm* — Keller Preece PLLC

(57) ABSTRACT

The disclosure describes embodiments of systems, methods, and non-transitory computer readable storage media that dynamically surface multiple user-specific application function GUIs for setting up (or accessing) application functions for a user account. For instance, the disclosed systems can select and display a GUI for a first application function from a set of application functions. Moreover, upon receiving user interactions with the GUI for the first application function (and identifying whether or not the first application system is activated for the user account), the disclosed systems can select a second application function from the set of application functions and displays a GUI (e.g., a setup interface) for the second application function from the set of application functions. In some implementations, the disclosed systems can utilize computer-based models to determine user account specific application function metrics and intelligently select and surface application functions using the application function metrics.

20 Claims, 11 Drawing Sheets

(51) Int. Cl.
*H04M 1/72469* (2021.01)
*G06Q 40/02* (2023.01)

(56) References Cited

U.S. PATENT DOCUMENTS

| | | | | |
|---|---|---|---|---|
| 2021/0342838 A1* | 11/2021 | Hoggard | ................ | H04L 9/088 |
| 2022/0084111 A1* | 3/2022 | Ladzik | ................ | G06Q 20/389 |
| 2022/0366077 A1* | 11/2022 | Won | ...................... | G06F 3/0484 |
| 2023/0169127 A1* | 6/2023 | Barbedor | ............ | G06Q 10/109 |
| | | | | 715/764 |
| 2023/0334514 A1* | 10/2023 | Hernandez Rivera | ...................... | |
| | | | | G06Q 30/01 |
| 2023/0362281 A1* | 11/2023 | Lee | ...................... | G06F 3/0484 |

* cited by examiner

GENERATING DYNAMIC USER SPECIFIC APPLICATION FUNCTION SETUP INTERFACES

BACKGROUND

Recent years have seen a significant development in systems that utilize web-based and mobile-based applications to manage user accounts and digital information for user accounts in real time. For example, many conventional applications provide various graphical user interfaces (GUIs) to present user interfaces to configure application functions on client devices. For example, such user interfaces can often include user interfaces to setup user accounts or setup payment services (e.g., digital wallet services) through mobile devices. As an example, in some cases, conventional applications often provide, on mobile devices, user interface flows in a pre-established order to display configuration menus for application functions for functions, such as, functions to setup accounts, to setup payment services (e.g., digital wallet services), and to personalize settings on application services provided in a mobile application. Although conventional systems attempt to present user interfaces to configure application functions of user accounts on web-based and mobile-based applications, such conventional systems face a number of technical shortcomings, particularly with regard to flexible and efficient user interfaces that display functionalities for various application functions on web-based and mobile-based applications.

To illustrate, conventional systems oftentimes provide rigid user interfaces for application functions. For instance, in many cases, conventional systems utilize disjointed setup and setting interfaces for application functions that are not intuitive to navigate. Indeed, oftentimes, users are required to access individual setup and setting interfaces for different application functions in different locations and/or via different access workflows. This often results in inflexible user interfaces for application functions that are difficult to utilize or locate on mobile devices with small screens.

In addition, in certain instances, conventional systems utilize rigid user interface flows for application functions that are pre-established during development of the application functions. This often results in conventional systems providing an increasing number of static interfaces for application functions as the number of application functions increase in an application. Indeed, the increasing number of static interfaces, in many conventional systems, bloat user interface workflows for users with irrelevant application functions user interfaces in mobile devices with small screens.

Moreover, many conventional systems inefficiently utilize computational resources to present user interfaces for application functions. In particular, conventional systems often utilize rigid and static user interfaces (as described above) that result in excessive navigation between different user interfaces within small screens of mobile devices. To illustrate, in many cases, conventional systems require users to individually access different setup and setting interfaces to operate an application function. Accordingly, in some instances, conventional systems that include various application functions require users to find and navigate between multiple UIs in different sections of an application to display functionalities for those various application functions. Due to the increased user navigation between multiple UIs in different sections of an application, such conventional systems often utilize an excessive number of computational resources to load and display the various interfaces during the increased user navigation.

SUMMARY

The disclosure describes one or more embodiments of systems, methods, and non-transitory computer-readable media that dynamically surface multiple user-specific application function graphical user interfaces (GUIs) to efficiently setup or access application functions with reduced user navigation. For instance, the disclosed systems can identify a set of application functions and the activation status of the application functions in relation to a user account. Moreover, the disclosed systems can determine an order in which to surface the application functions for the user account. In some implementations, the disclosed systems display various setup interfaces and/or setting interfaces for the application functions using the determined order (and activation status). For example, the disclosed systems can display a GUI for a first application GUI for a first application function. Then, upon receiving user interactions with the first application GUI, the disclosed systems can select and display a GUI for a second application function.

Furthermore, in some implementations, the disclosed systems intelligently select and surface GUIs for various application functions (specific to a user account). In particular, the disclosed systems utilize user activity data to determine an order and/or score for the application functions (e.g., a propensity score or a retention score). Then, the disclosed systems select GUIs to surface for the application functions using the order and/or score. Indeed, the disclosed systems can surface a first application function (e.g., having the highest score and/or being first in an order) with options to setup the first application function or, if identified as active on the user account, with options to configure settings for the first application function. Subsequently, the disclosed systems can select a second application function utilizing the order and/or the score associated with the second application function to surface GUIs for the selected second application function.

BRIEF DESCRIPTION OF THE DRAWINGS

The detailed description is described with reference to the accompanying drawings in which.

DETAILED DESCRIPTION

Figure 1:
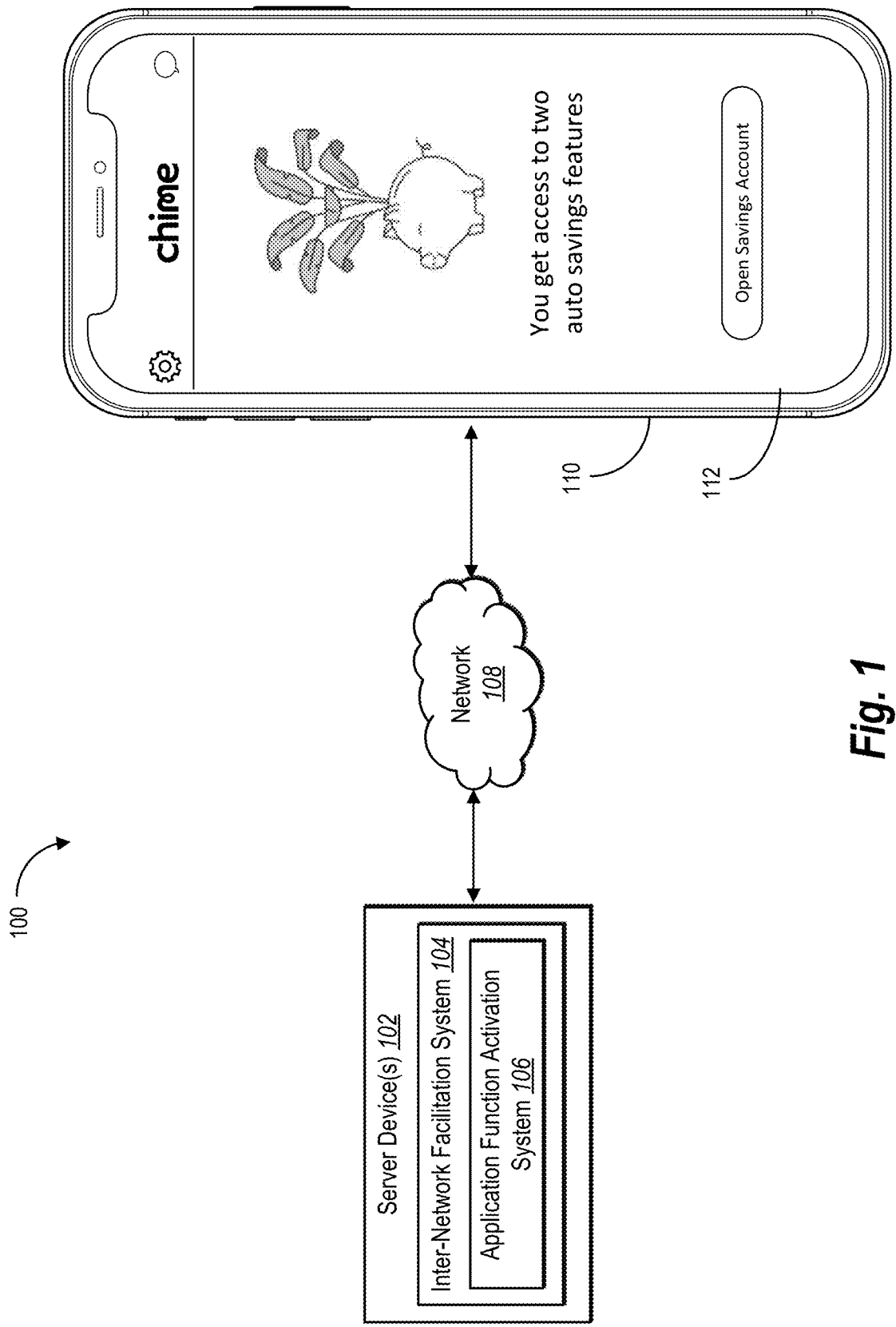
FIG. 1 illustrates a schematic diagram of an environment for implementing an inter-network facilitation system and an application function activation system in accordance with one or more implementations.

The disclosure describes one or more embodiments of an application function activation system that dynamically surfaces multiple user-specific application function GUIs for setting up (or accessing) application functions for a user account. For instance, the application function activation system can identify a set of application functions for an inter-network facilitation system application. In addition, the application function activation system can select and display a GUI for a first application function from the set of application functions. Moreover, upon receiving user interactions with the GUI for the first application function (and identifying whether or not the first application system is activated for the user account), the application function activation system selects a second application function from the set of application functions and displays a GUI (e.g., a setup interface) for the second application function from the set of application functions. In some implementations, the application function activation system utilizes computer-based models to determine user account specific application function metrics and intelligently selects and surfaces application functions using the application function metrics.

In one or more embodiments, the application function activation system identifies a set of application functions of an inter-network facilitation system. For example, the application function activation system can identify a set of application functions utilizable on a user account of the inter-network facilitation system. In one or more embodiments, the set of application functions include functions, such as, but not limited to, a base limit value utilization application, a user risk assessment value application, a credit value selection application, an automatic user account value allocation application, or a user account value transfer application.

Moreover, the application function activation system can select and display GUIs for accessing and/or setting up the set of application functions on a client device corresponding to the user account. In particular, the application function activation system can select a first application function from the set of application functions and provide, for display on the client device of the user account, one or more GUIs for the first application function. Indeed, in some cases, the application function activation system provides, for display on the client device, a setup interface to activate the first application function for the user account. For instance, the application function activation system can provide, for display on the client device, the setup interface with selectable options to initiate the first application function for the user account using user-selected settings or preferences for the first application function. In some implementations, the application function activation system also provides, for display on the client device, a selectable option to skip (or decline) the setup process for the first application function.

Furthermore, in one or more embodiments, the application function activation system can identify an activation status of the first application function in relation to the user account. For instance, the application function activation system can determine that the first application function is activated for the user account (e.g., via a previous activation activity and/or from the above-mentioned setup interface). In one or more embodiments, upon identifying that the first application function is activated for the user account, the application function activation system can provide, for display on the client device, a GUI that indicates the activation status of the first application function and a selectable option to navigate to the next application function from the set of application functions.

In some implementations, upon identifying that the first application function is activated for the user account, the application function activation system can provide, for display on the client device, a GUI with selectable options to access and/or configure settings of the activated first application function. For example, the application function activation system can provide, for display on the client device, access to features (or options) of the first application function (e.g., to utilize the first application function on the user account). In some cases, the application function activation system can provide, for display on the client device, selectable options to adjust (or configure) settings (or preferences) of the user account in relation to the first application function.

Upon receiving a user interaction from the client device with at least one of the selectable options mentioned above (e.g., setting up the first application function, skipping the first application function setup, selecting to navigate to the next application function, accessing and/or modifying settings of an activated first application function), the application function activation system can select a second application function for the user account. Moreover, the application function activation system can display GUIs for accessing and/or setting up the selected second application function on the client device corresponding to the user account. For instance, the application function activation system can provide GUIs with options to setup the second application function, skip the second application function setup, select to navigate to the next application function, access and/or modify settings of an activated second application function. In one or more embodiments, the application function activation system can continue to select and display GUIs for one or more application functions from the set of application functions for the user account (e.g., as a sequence of application functions).

Additionally, in one or more implementations, the application function activation system intelligently selects and surfaces GUIs for various application functions (specific to a user account). In particular, the application function activation system utilizes user account activity data and the application functions with a computer-based model to determine application function metrics for the application functions in relation to the user account. Then, the application function activation system utilizes the application function metrics corresponding to the application functions to select (or rank) application functions for the user account. In some cases, the application function activation system utilizes an application activation propensity model to determine a propensity metric for an application function that represents a likelihood of the application function being activated on the user account (e.g., a propensity to attach an application function). Moreover, in one or more embodiments, the application function activation system utilizes a user account retention model to determine a retention metric for an application function that represents a likelihood of the user account remaining active after activating the application function on the user account.

In some implementations, the application function activation system utilizes application function metrics corresponding to application functions (e.g., application metrics determined as described above) to select the application functions from the set of application functions. In particular, the application function activation system 106 can utilize application function metrics (e.g., one or more of propensity metrics, retention metrics, and/or other application function metrics) to rank and/or order the application functions in the set of application functions (for a particular user account). Then, the application function activation system can select application functions from the ranked or ordered set of application functions to surface (or display) GUIs for the user account. As an example, the application function activation system can select a highest ranked application function from the set of application functions as the application function to surface within a GUI of a client device of the user account (e.g., as the first application function). Moreover, the application function activation system can select the subsequent highest (e.g., second highest) application from the set of application functions as the subsequent application function to surface within a GUI of a client device of the user account (e.g., as the second application function). Indeed, the application function activation system can continue to select from the ranked order of application functions to display the application function.

The application function activation system can provide numerous technical advantages, benefits, and practical applications to relative conventional systems. For example, unlike conventional systems that utilize rigid and inefficient user interfaces to display functionalities for various application functions on web-based and mobile-based applications, the application function activation system dynamically and intelligently surfaces multiple user-specific application function GUIs to efficiently setup or access application functions with reduced user navigation. Indeed, the application function activation system can display robust user specific application function GUIs that enable easier and quicker setup (or access) for the application functions with reduced user navigation.

To illustrate, unlike conventional systems that utilize disjointed setup and setting interfaces for application functions, the application function activation system can surface multiple user-specific application function GUIs for a user account to efficiently setup or access application functions in one sequence. Indeed, the application function activation system can dynamically surface the multiple user-specific application function GUIs according to activation statuses of the application functions for the user account to minimize or reduce user efforts to locate and navigate to disjointed setup and setting interfaces for multiple application functions. In contrast, the application function activation system generates an accessible workflow to setup (or access) multiple application functions in a sequence (that is efficient and easier to navigate within mobile devices with small screens).

Furthermore, in contrast to conventional systems that utilize rigid, static pre-established user interface flows for application functions, the application function activation system can dynamically and intelligently surface multiple user-specific application function GUIs that are user specific. In particular, the application function activation system can change (or cater) a selection and display of GUIs for application functions specifically to a user account by using user activity data in relation to the application functions (e.g., by using a ranked set of application functions that is specific to the user account). Indeed, the application function activation system can rearrange the setup interfaces (or other interfaces) of the application functions using tracked user activity data for the application functions (e.g., the user activity data's effect on user account retention and/or application function propensity). In addition, the application function activation system can also select (or arrange) the interfaces of the application functions based on identified activation states between the user account and the application functions. By dynamically arranging and displaying GUIs for application functions specifically to a user account (based on user activity data), the application function activation system creates a practical application that improves efficiency in setup or access of application functions with reduced user navigation while also increasing ease of use on mobile devices with small screens.

Additionally, the application function activation system can also improve computing efficiency. In particular, by dynamically surfacing multiple user-specific application function GUIs for setting up (or accessing) application functions for a user account, the application function activation system reduces the number of navigational steps required within a GUI in a limited screen space of a mobile device. As mentioned above, unlike conventional systems that utilize disjointed setup and setting interfaces for application functions, the application function activation system can efficiently utilize screen space and less computational resources by surfacing user-relevant GUIs for application functions without user navigation to different user interfaces within a web-based and/or mobile-based application. Indeed, the reduction in user navigation and accessibility to multiple setup interfaces and/or accessibility interfaces for user-catered application functions also reduce the computational resources required when users attempt to utilize or locate disjointed application functions on mobile devices with small screens.

As indicated by the foregoing discussion, the present disclosure utilizes a variety of terms to describe features and advantages of the application function activation system. As used herein, the term "application function" refers to a service, function, or feature within a web-based, computer-based, and/or mobile-based application. For example, an application function can include a service or feature implemented within a system or application that provides a functionality (e.g., software-based and/or product-based) to a user of a user account. In certain instances, an application function can include software-based service or product implemented within an inter-network facilitation system (e.g., as described in FIG. 1). For example, an application function can include, but is not limited to, a base limit value utilization application, a user risk assessment value application, a credit value selection application, an automatic user account value allocation application, or a user account value transfer application.

Furthermore, as used herein, the term "application function metric" refers to information (e.g., a numerical value or score, a probability, a categorization) that represents a relevancy (or popularity) of an application function in relation to a user account (or user accounts). For instance, in some cases, an application function metric includes a numerical value (or rank) that represents a popularity (or level of interest) of an application function among one or more users of an inter-network facilitation system. In one or more implementations, the application function metric includes a propensity metric and/or a retention metric of an application function in relation to a user account (or user accounts).

For example, as used herein, the term "propensity metric" refers to information (e.g., a numerical value or score, a probability, a categorization) that represents a likelihood of an application function being activated on a user account. In particular, a propensity metric of an application function can represent the probability of the application function being selected and activated by a user of a user account upon displaying a GUI (e.g., a setup interface) for the application function. In some cases, the propensity metric can indicate the likelihood of an application function being activated on a user account and being utilized by the user account (e.g., attachment). In one or more instances, the application function activation system determines (e.g., using an application activation propensity model) a propensity metric of an application function utilizing inactive and active statuses of application functions, user activity data of one or more user accounts, and/or activation statistics associated with the application functions in relation to one or more other application functions.

As used herein, the term "application activation propensity model" refers to a computer-based model that determines (and/or outputs) a propensity metric for an application function in relation to one or more user accounts from application function data and/or user activity data. For example, an application activation propensity model can include a mapping between user activity data and propensity metrics in relation to an application function. In some cases, the application activation propensity model includes a machine learning model that analyzes user activity data and/or application function statistics (and/or features) to output a propensity metric for the application function in relation to one or more user accounts. In some cases, the application activation propensity model includes a computer-based model (or representation) generated through a machine learning model to create mappings between user activity data and propensity metrics in relation to an application function.

Furthermore, as used herein, the term "retention metric" refers to information (e.g., a numerical value or score, a probability, a categorization) that represents a likelihood of user account remaining active after activating an application function on the user account. In particular, a retention metric of an application function can represent an effect of activating the application function on a user account has on retention of the user account (e.g., the user account remaining active). For instance, a retention metric for an application function can include information (e.g., a numerical value) that represents an increase (and/or decrease) in a probability of one or more user accounts remaining active (or the one or more user accounts deactivating the user accounts) upon utilizing (or activating) the particular application function. In one or more instances, the application function activation system determines (e.g., using a user account retention model) a retention metric of an application function utilizing inactive and active statuses of application functions, user activity data of one or more user accounts, activation statistics associated with the application functions in relation to one or more other application functions, and/or activation statistics of one or more user accounts in relation to one or more application functions.

Moreover, as used herein, the term "user account retention model" refers to a computer-based model that determines (and/or outputs) a retention metric for an application function in relation to one or more user accounts from application function data and/or user activity data. For example, a user account retention model can include a mapping between user activity data and retention metrics in relation to an activation status of (or activity data with) an application function. In some cases, the user account retention model includes a machine learning model that analyzes user activity data and/or application function statistics (and/or features) to output a retention metric for the application function in relation to one or more user accounts. In some cases, the user account retention model includes a computer-based model (or representation) generated through a machine learning model to create mappings between user activity data and retention metrics in relation to an application function.

As used herein, the term "machine learning model" refers to a computer model that can be trained (e.g., tuned or learned) based on inputs to approximate unknown functions and corresponding outputs. As an example, a machine learning model can include, but is not limited to, a neural network (e.g., a convolutional neural network, recurrent neural network, or deep learning model), a decision tree (e.g., a gradient boosted decision tree, a random forest decision tree, a decision tree with variable or output probabilities), and/or a support vector machine.

As used herein, the term "user activity data" refers to information (or data) associated with interactions of a user within and/or in connection with an inter-network facilitation system (as described in FIG. 1). To illustrate, user activity data can include, but is not limited to, historical utilization of an application or one or more application functions, historical transaction activity within the user account (e.g., payments, setting changes, payment scheduling), historical deposit transactions, client device data (e.g., geo-location data, phone number data), historical withdrawal transactions, deposit transaction source information (e.g., employer, account information for deposit transaction party, pay stub data), active or associated application functions (or products), and/or user account data (e.g., address, email address, employment, estimated income, phone number, username).

Turning now to the figures, FIG. 1 illustrates a block diagram of a system 100 (or system environment) for implementing an inter-network facilitation system 104 and an application function activation system 106 in accordance with one or more embodiments. As shown in FIG. 1, the system 100 includes server device(s) 102 (which includes the inter-network facilitation system 104 and the application function activation system 106) and client device 110. As further illustrated in FIG. 1, the server device(s) 102 and the client device 110 can communicate via the network 108.

Although FIG. 1 illustrates the application function activation system 106 being implemented by a particular component and/or device within the system 100, the application function activation system 106 can be implemented, in whole or in part, by other computing devices and/or components in the system 100 (e.g., the client device 110). Additional description regarding the illustrated computing devices (e.g., the server device(s) 102, computing devices implementing the application function activation system 106, the client device 110, and/or the network 108) is provided with respect to FIGS. 9 and 10 below.

As shown in FIG. 1, the server device(s) 102 can include the inter-network facilitation system 104. In some embodiments, the inter-network facilitation system 104 can determine, store, generate, and/or display financial information corresponding to a user account (e.g., a banking application, a money transfer application). Furthermore, the inter-network facilitation system 104 can also electronically communicate (or facilitate) financial transactions between one or more user accounts (and/or computing devices). Moreover, the inter-network facilitation system 104 can also track and/or monitor financial transactions and/or financial transaction behaviors of a user within a user account.

The inter-network facilitation system 104 can include a system that comprises the application function activation system 106 and that facilitates financial transactions and digital communications across different computing systems over one or more networks. For example, the inter-network facilitation system 104 manages credit accounts, secured accounts, and other accounts for one or more accounts registered within the inter-network facilitation system 104. In some cases, the inter-network facilitation system 104 is a centralized network system that facilitates access to online banking accounts, credit accounts, and other accounts within a central network location. Indeed, the inter-network facilitation system 104 can link accounts from different network-based financial institutions to provide information regarding, and management tools for, the different accounts.

In one or more embodiments, the application function activation system 106 dynamically surfaces multiple user-specific application function GUIs for setting up (or accessing) application functions for a user account. For instance, the application function activation system 106 can iteratively select and display application function GUIs for setting up (or accessing) application functions upon receiving user interactions with one or more of the GUIs of the application functions. Moreover, in some cases, the application function activation system 106 can utilize computer-based models to determine user account specific application function metrics and intelligently select and display application functions using the application function metrics (in relation to the user account).

As also illustrated in FIG. 1, the system 100 includes the client device 110. For example, the client device 110 may include, but are not limited to, mobile devices (e.g., smartphones, tablets) or other type of computing devices, including those explained below with reference to FIGS. 9 and 10. Additionally, the client device 110 can include computing devices associated with (and/or operated by) user accounts for the inter-network facilitation system 104. Moreover, the system 100 can include various numbers of client devices that communicate and/or interact with the inter-network facilitation system 104 and/or the application function activation system 106.

Furthermore, as shown in FIG. 1, the client device 110 can include a client application 112. The client application 112 can include instructions that (upon execution) cause the client device 110 to perform various actions. For example, a user of a user account can interact with the client application 112 on the client device 110 to access financial information, initiate a financial transaction (e.g., transfer money to another account, deposit money, withdraw money), access or display various application functions (in accordance with one or more embodiments herein), and/or access or provide data (to the server device(s) 102). Furthermore, in one or more implementations, the client application 112 can dynamically surface multiple user-specific application function GUIs for setting up (or accessing) application functions for a user account (in accordance with one or more implementations).

In certain instances, the client device 110 corresponds to one or more user accounts (e.g., user accounts stored at the server device(s) 102). For instance, a user of a client device can establish a user account with login credentials and various information corresponding to the user. In addition, the user accounts can include a variety of information regarding financial information and/or financial transaction information for users (e.g., name, telephone number, address, bank account number, credit amount, debt amount, financial asset amount), payment information (e.g., account numbers), transaction history information, contacts for financial transactions, and/or information and/or activity with one or more application functions. In some embodiments, a user account can be accessed via multiple devices (e.g., multiple client devices) when authorized and authenticated to access the user account within the multiple devices.

The present disclosure utilizes client devices to refer to devices associated with such user accounts. In referring to a client (or user) device, the disclosure and the claims are not limited to communications with a specific device, but any device corresponding to a user account of a particular user. Accordingly, in using the term client device, this disclosure can refer to any computing device corresponding to a user account of the inter-network facilitation system 104.

As further shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIG. 10. Furthermore, although FIG. 1 illustrates the server device(s) 102 and the client device 110 communicating via the network 108, the various components of the system 100 can communicate and/or interact via other methods (e.g., the server device(s) 102 and the client device 110 can communicate directly).

Figure 2:
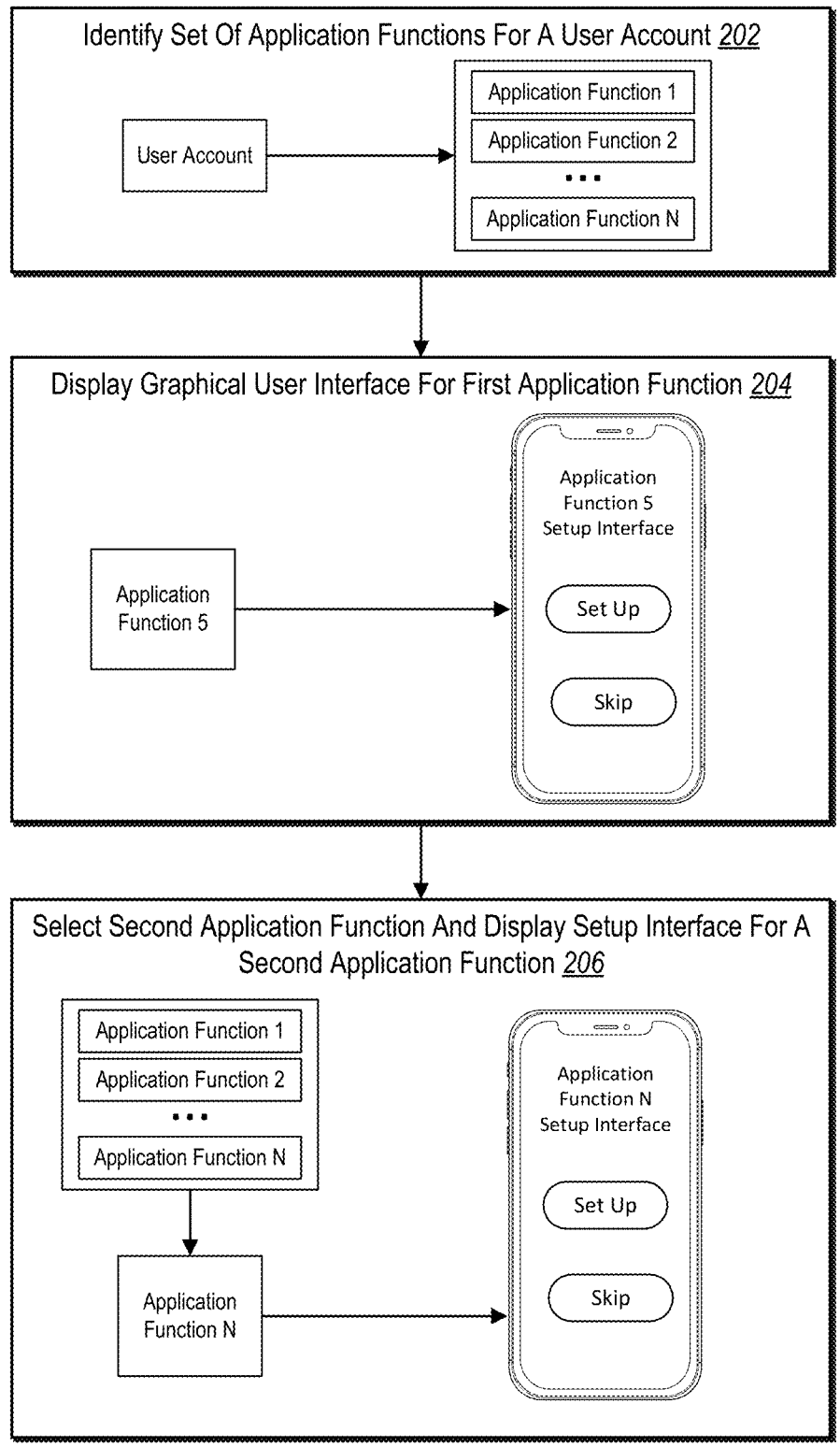
FIG. 2 illustrates an overview of an application function activation system dynamically surfacing multiple user-specific application function GUIs for setting up (or accessing) application functions for a user account in accordance with one or more implementations.

As mentioned above, the application function activation system 106 can dynamically surface multiple user-specific application function GUIs to efficiently setup or access application functions with reduced user navigation. For example, FIG. 2 illustrates an overview of the application function activation system 106 dynamically surfacing multiple user-specific application function GUIs for setting up (or accessing) application functions for a user account. In particular, as shown in FIG. 2, the application function activation system 106 identifies a set of application functions for a user account, displays a graphical user interface for a first application function, and selects a second application function to display a setup interface for the second application function (e.g., upon receiving user interactions with the GUI of the first application function).

As shown in act 202 of FIG. 2, the application function activation system 106 identifies a set of application functions for a user account. As shown in the act 202, the application function activation system 106 identifies a set of application functions (e.g., application functions 1 through application functions N) for a user account (e.g., application functions that a user account is eligible to utilize). Indeed, the application function activation system 106 can identify application functions available on the inter-network facilitation system 104 for the user account. In one or more instances, the application function activation system 106 identifies application functions that are compatible with the user account (e.g., the user account is eligible and capable of a service and/or product corresponding to the application function).

In one or more embodiments, the application function activation system 106 determines whether the application function is activated (or not activated) for a user account. In particular, the application function activation system 106 can utilize user activity data corresponding to a user account to identify activation statuses of one or more application functions. For instance, the application function activation system 106 can determine that an application function is activated upon identifying activity data that indicates activation of the application function on the user account (e.g., enrollment on, utilization on, transactions with the application function) or through a flag that indicates that the application function is activated on the user account. Moreover, in some cases, the application function activation system 106 determines that an application function is not activated for a user account upon determining that the user account includes no interactions or enrollment events with the application function.

Furthermore, in some embodiments, the application function activation system 106 determines whether a user account is eligible to utilize a particular application function. For instance, the application function activation system 106 can identify one or more requirements or criteria for activating an application function on a user account (e.g., historical user activities, account types, deposit transaction activity, payments, deposit transaction amounts). Moreover, the application function activation system 106 can determine that a user account includes user account activities (or data) that satisfy the one or more requirements and/or criteria. Upon determining that the user account satisfies the one or more requirements and/or criteria, the application function activation system 106 can determine that the user account is eligible for the particular application function.

In some embodiments, in the act 202, the application function activation system 106 can order or rank the application functions within the set of application functions based on user activity data (of the user account) and/or application function data for the application functions. In particular, the application function activation system 106 can determine application function metrics (e.g., propensity metrics, retention metrics) for the application functions in the set of application functions in relation to the user account. Then, the application function activation system 106 can order or rank the application functions within the set of application functions based on the application functions determined for the particular user account.

Additionally, as shown in act 204 of FIG. 2, the application function activation system 106 displays a graphical user interface for a first application function (from the set of application functions). For example, as shown in the act 204 of FIG. 2, the application function activation system 106 selects an application function (e.g., application function 5) from the set of application functions (e.g., using random selection, application function metrics, and/or based on an ordering or ranking of the set of application functions as described below). Then, the application function activation system 106 can display a GUI for the selected application function (e.g., a setup interface). Indeed, the application function activation system 106 displaying a GUI for an application function is described below (e.g., in relation to FIGS. 3-7).

Furthermore, as shown in act 206 of FIG. 2, the application function activation system 106 selects a second application function and displays a setup interface for the second application function. For instance, as shown in the act 206 of FIG. 2, the application function activation system 106 selects an additional (e.g., second) application function from the set of application functions and displays a GUI for the second application function (e.g., a setup interface) within a client device of a user account. In one or more embodiments, the application function activation system 106 selects the second (and other subsequent application functions) using random selection, application function metrics, and/or based on an ordering or ranking of the set of application functions as described below. Furthermore, the application function activation system 106 can display the GUI for the second application to display various combinations of selectable options (e.g., for setting up the application function, skipping the application function setup, selecting to navigate to the next application function, accessing and/or modifying settings of an activated application function). Indeed, the application function activation system 106 selecting and displaying a GUI for a second application function is also described below (e.g., in relation to FIGS. 3-7).

Figure 3:
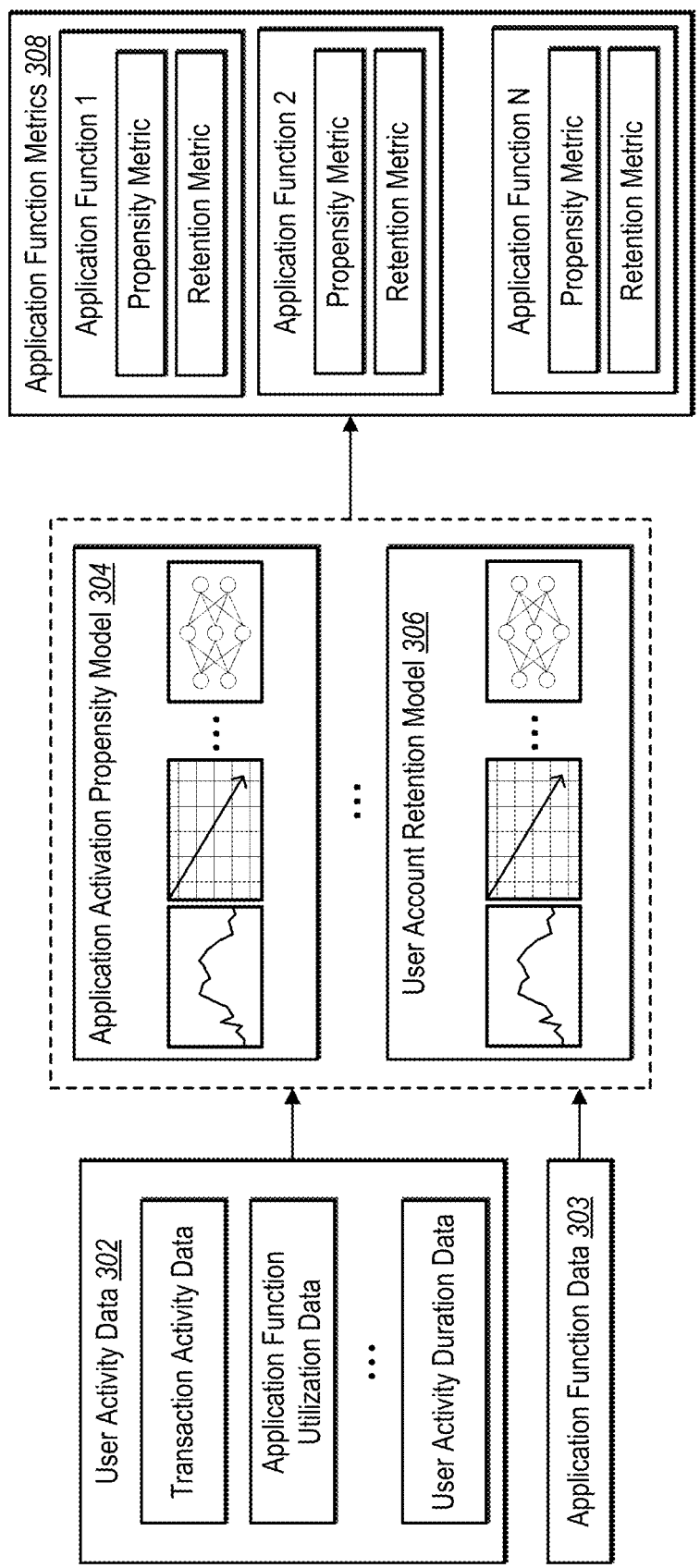
FIG. 3 illustrates an application function activation system utilizing user activity data with computer-based models to determine application function metrics for one or more application functions in accordance with one or more implementations.

As mentioned above, in some implementations, the application function activation system 106 utilizes user activity data to determine an order and/or score for the application functions (e.g., application function metrics). For instance, FIG. 3 illustrates the application function activation system 106 utilizes user activity data with one or more computer-based models to determine application function metrics for one or more application functions. Indeed, in one or more embodiments, the application function activation system 106 utilizes determined application function metrics corresponding to the application functions to intelligently select and surface GUIs for various application functions (specific to a user account).

To illustrate, as shown in FIG. 3, the application function activation system 106 identifies user activity data 302 (e.g., transaction activity data, application function utilization data, user activity duration data) and application function data 303. Subsequently, as shown in FIG. 3, the application function activation system 106 utilizes the user activity data 302 and the application function data 303 with an application activation propensity model 304 and a user account retention model 306. As further shown in FIG. 3, the computer-based models (e.g., the application activation propensity model 304 and the user account retention model 306) determine application function metrics 308 for one or more application functions (from the user activity data 302 and the application function data 303). Indeed, as illustrated in FIG. 3, the application function activation system 106 utilizes the application activation propensity model 304 to determine propensity metrics for one or more application functions (e.g., a propensity metric for each of application function 1 through application function N). In addition, as shown in FIG. 3, the application function activation system 106 utilizes the user account retention model 306 to determine retention metrics for one or more application functions (e.g., a retention metric for each of application function 1 through application function N).

In some instances, as shown in FIG. 3, the application function activation system 106 utilizes transaction activity data from the user activity data 302 (for the application activation propensity model 304 and/or the user account retention model 306). In one or more implementations, the application function activation system 106 identifies transaction activity data that indicates various transactions and/or various user activities of a user within one or more user accounts of the inter-network facilitation system 104. For example, transaction activity data can include data, such as, but not limited to, utilization of an application, transaction activity within the user account (e.g., payments, setting changes, payment scheduling), withdrawal transactions, spend behavior, sources of referral for accessing the client application 112, ATM utilization, and/or deposit transactions. Indeed, the user transaction activity data can include various activities within an application, such as log in activity, setting configuration changes, and/or providing of (and/or changing of) user account data.

In addition, as shown in FIG. 3, the application function activation system 106 utilizes application function utilization data from the user activity data 302 (for the application activation propensity model 304 and/or the user account retention model 306). In one or more embodiments, the application function activation system 106 identifies application function utilization data that indicates various actions, interactions, and/or activity corresponding to one or more application functions. For instance, the application function utilization data can include data, such as, but not limited to, information on whether an application function is activated for a user account, activity of a user account with an application function, historical skips (or cancellations) of an application function, and/or hits (or views) with an application function.

In some cases, the application function utilization data can include enrollment data for a user account. For example, the application function activation system 106 can utilize enrollment data that indicates an enrollment status of a user account within a particular application function. Furthermore, the application function activation system 106 can utilize enrollment data that indicates a channel of enrollment for the particular application function, such as, but not limited to, enrollment via a setup interface (as described herein), enrollment via a digital advertisement, enrollment via a search engine, enrollment via a browser, enrollment via an application of the inter-network facilitation system 104, and/or enrollment via a customer service representative (e.g., via chat, voice, and/or in-person interactions).

Moreover, as shown in FIG. 3, the application function activation system 106 utilizes user activity duration data from the user activity data 302. For example, in one or more embodiments, the application function activation system 106 can identify user activity duration data that indicates statistics of a user account for interactions with the inter-network facilitation system 104 and/or one or more application functions. To illustrate, in some implementations, the application function activation system 106 can identify an amount of time a user account has been active in the inter-network facilitation system 104. Furthermore, the application function activation system 106 can identify an amount of time a user account has utilized a particular application function, an amount of time since deactivating a particular application function, and/or an amount of time since activating a particular application function. In some cases, the application function activation system 106 can utilize an amount of time from a first user account deposit transaction as user activity duration data.

Although FIG. 3 illustrates particular types of user activity data, the application function activation system 106 can utilize various other user activity data. For instance, the application function activation system 106 can utilize client device data (e.g., geo-location data, OS data). In addition, the user activity data can include user account data (e.g., address, email address, employment, estimated income, pay stub data, phone number data, birth of date data).

In addition, as shown in FIG. 3, the application function activation system 106 can utilize application function data 303 (for the application activation propensity model 304 and/or the user account retention model 306). For example, the application function activation system 106 can identify statistical data for one or more application functions, such as, but not limited to, total usage time across user accounts, total views across user accounts, and/or conversion rates for the application functions. In addition, the application function data can include data, such as, demographic data corresponding to one or more application functions (e.g., income ranges for users of a particular application function, age of users of a particular application function, residence, or region of a particular application function).

Additionally, although one or more embodiments herein describe utilizing user account activity data of a user account, the application function activation system 106 can utilize aggregated user account activity data (or user account activity data of multiple user accounts). For instance, the application function activation system 106 can collect (or identify) user account activity data from multiple user accounts and generate aggregated data (e.g., an average amount of time of user activity with an application function, an average number of views for an application function, the average age of users for an application function, an average number of transactions within an application function). Indeed, in one or more embodiments, to determine specific application function metrics for application functions in relation to a particular user account, the application function activation system 106 can utilize the application activation propensity model 304 and/or the user account retention model 306 with one of (or both of) the aggregated user account activity data and user activity account data for the particular user (e.g., as a comparison).

Furthermore, in one or more embodiments, the application function activation system 106 can utilize an application activation propensity model. For instance, the application function activation system 106 utilizes an application activation propensity model with user activity data (and/or application function data) to determine a propensity metric for an application function in relation to a user account. Indeed, the propensity metric can represent a likelihood of a user account activating an application function. In particular, the propensity metric can indicate the likelihood of an application function, if presented to a user account, converting to an activated application function on the user account.

In one or more implementations, the application function activation system 106 utilizes a rule-based (or matrices-based) application activation propensity model. For example, the application function activation system 106 can utilize a matrix-based table that maps various user activity data to propensity metrics for application functions. For instance, the application function activation system 106 can map a propensity metric (e.g., a specific value or value range) to one or more combinations of (or aggregated) user activity data and/or application function activation data. Then, the application function activation system 106 can utilize user activity data from a user account to reference the aggregated user activity data (and application function activation data) in the matrix-based table to identify a propensity metric for the user account. For example, certain user activity data can be associated with higher (or lower) propensity to activate an application function on a user account.

Moreover, in some cases, the application function activation system 106 can utilize a machine learning-based application activation propensity model to determine propensity metrics between user accounts and application functions. For example, the application function activation system 106 can input user account activity data (and application function data) into the machine learning-based application activation propensity model. Moreover, the machine learning-based application activation propensity model analyzes the user account activity data (and application function data) to generate propensity metrics as an output for the application functions.

In some embodiments, the application function activation system 106 can train the machine learning-based application activation propensity model by comparing outputs of the machine learning-based application activation propensity model to known user activations of application functions and the user activity data of the known user account (e.g., as ground truth data). Indeed, the application function activation system 106 can utilize the comparison to generate loss data. Then, the application function activation system 106 can utilize the loss data to learn parameters of the machine learning-based application activation propensity model (e.g., back propagation).

Moreover, the application function activation system 106 can generate (or determine) various types of propensity metrics. For instance, the propensity metric can include a probability value that represents a likelihood (or probability) of a user account activating a particular application function. In some cases, the application function activation system 106 can determine a probability of a user account activating a particular application function and determine a propensity score based on the probability as the propensity metric. In some cases, the application function activation system 106 can determine a probability of a user account activating a particular application function and determine a propensity category (or tier) for the application function in relation to the user account (e.g., a high propensity category, a medium propensity category, or a low propensity category).

In some cases, the application function activation system 106 can utilize the application activation propensity model to determine a propensity metric for an application function in relation to a user account based on a combination of other activated application functions. In particular, the application function activation system 106 can determine a propensity metric for an application function based on user activity data and/or other application functions that the user account has already activated. For instance, the application function activation system 106 can determine a first propensity metric for an application function when the user account has already activated one or more other (or other specific) application function(s) and can determine a second propensity metric for the application function when the user has not already activated another (or another specific) application function. Indeed, the application function activation system 106 can utilize various combinations of activated application functions to determine propensity metrics for a particular application function.

In one or more implementations, the application function activation system 106 can utilize a user account retention model. For example, the application function activation system 106 can utilize a user account retention model with user activity data (and/or application function data) to determine a retention metric for a user account in relation to a particular application function. Indeed, the retention metric can represent a likelihood of a user account remaining active when the user account activates (or utilizes) the application function. In particular, the retention metric can indicate the likelihood (or increase in likelihood) that activating an application function would have on a user account remaining active (e.g., not churning).

In some embodiments, the application function activation system 106 can utilize a rule-based (or matrices-based) user account retention model. For instance, the application function activation system 106 can utilize a matrix-based table that maps various user activity data to retention metrics for application functions. Indeed, the application function activation system 106 can map a retention metric (e.g., an amount of probability increases or decreases in a user account remaining active) associated to one or more combinations of (or aggregated) user activity data and/or application function activation data. For example, the application function activation system 106 can map certain user activity data to various increases and/or decreases in probabilities of a user account remaining active upon using a particular application function. In some cases, the application function activation system 106 can utilize historical application function activity and user account cancellations to identify user account activity data that effects a probability of a user account remaining active upon using a particular application function as mappings in the matrix-based user account retention model. Then, the application function activation system 106 can utilize user activity data of a particular user account with the matrix-based user account retention model to identify (or determine) a retention metric for the user account in relation to a particular application function.

In some embodiments, the application function activation system 106 can utilize a machine learning-based user account retention model to determine retention metrics between user accounts and application functions. For example, the application function activation system 106 can input user account activity data (and application function data) into the machine learning-based user account retention model. Moreover, the machine learning-based user account retention model analyzes the user account activity data (and application function data) to generate retention metrics as an output for the user account in relation to the application functions.

In some embodiments, the application function activation system 106 can train the machine learning-based user account retention model by comparing outputs of the machine learning-based user account retention model to known user activations of application functions with user account cancellations and the user activity data of the known user account (e.g., as ground truth data). Indeed, the application function activation system 106 can utilize the comparison to generate loss data. Then, the application function activation system 106 can utilize the loss data to learn parameters of the machine learning-based user account retention model (e.g., back propagation).

Moreover, the application function activation system 106 can generate (or determine) various types of retention metrics. For instance, the retention metric can include a probability value that represents a likelihood (or probability) of a user account remaining active after activating a particular application function. In some cases, the application function activation system 106 can determine a probability of a user account remaining active after activating a particular application function and determine a retention score based on the probability as the retention metric. In some embodiments, the application function activation system 106 can determine a probability of a user account remaining active after activating a particular application function and determine a retention category (or tier) for the application function in relation to the user account (e.g., a high retention category, a medium retention category, or a low retention category) to categorize the likelihood of the user account remaining active (or cancelling the user account) because of the activated application function.

In one or more embodiments, the application function activation system 106 can utilize various combinations of application function metrics. For instance, the application function activation system 106 can determine and assign a retention metric to an application function for a user account and/or a propensity metric to the application function. In some cases, the application function activation system 106 can assign both the retention metric and the propensity metric to the application function.

Furthermore, the application function activation system 106 can determine various other application function metrics. For example, the application function activation system 106 can determine an application function utilization metric that indicates the likelihood of the user account utilizing the application function upon activating the application function. In some cases, the application function activation system 106 can determine an application function value metric that indicates an amount of value (e.g., a lifetime value transaction (LVT) or customer acquisition cost (CAC)) that activating an application function will provide.

Figure 4:
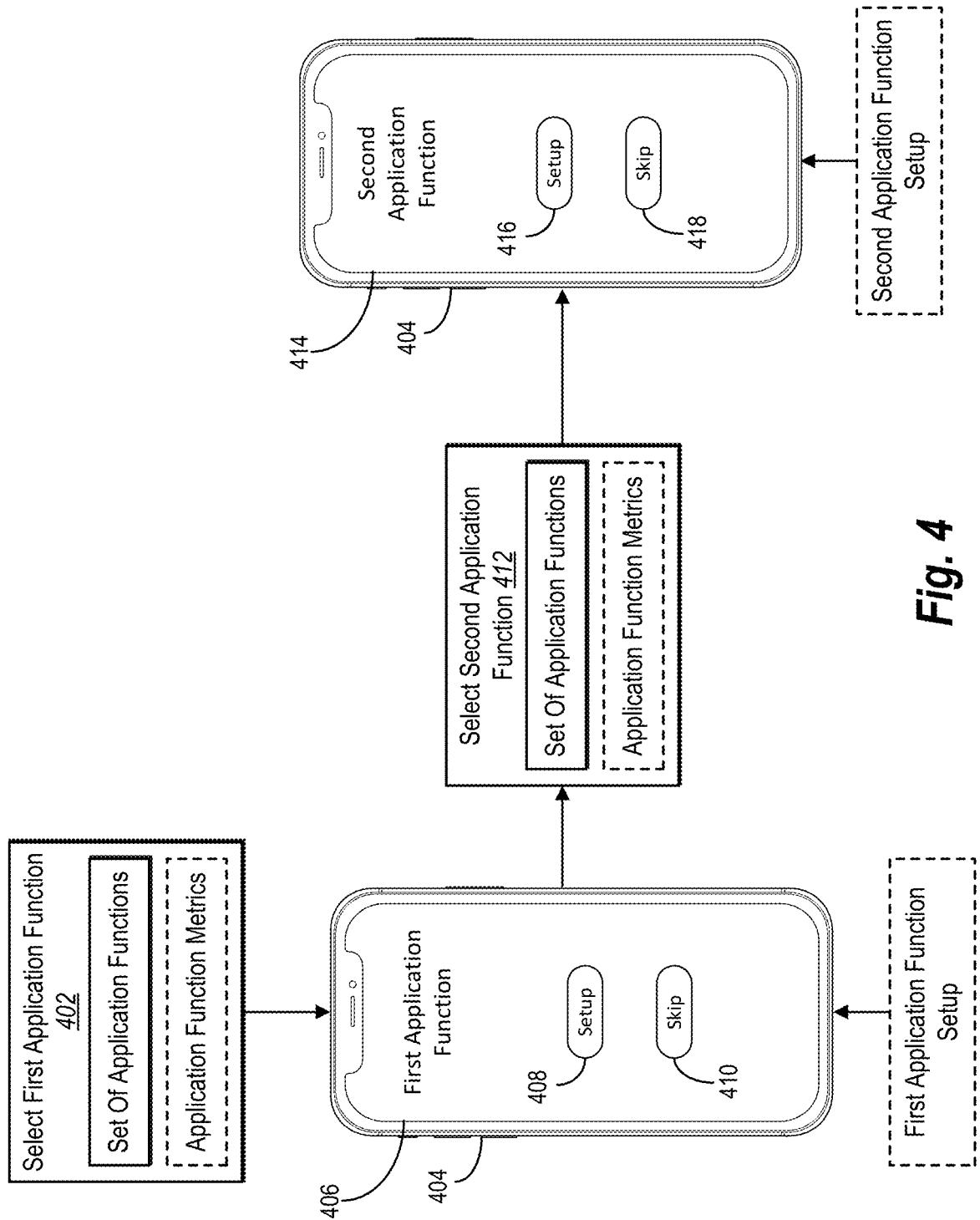
FIG. 4 illustrates a flow diagram of an application function activation system selecting and displaying various (user-specific) application function GUIs of application functions for a user account in accordance with one or more implementations.

As mentioned above, the application function activation system 106 can dynamically surface multiple user-specific application function GUIs for setting up (or accessing) application functions for a user account. For instance, FIG. 4 illustrates a flow diagram of the application function activation system 106 selecting and displaying various (user-specific) application function GUIs of application functions for a user account. In particular, FIG. 4 illustrates the application function activation system 106 selecting and displaying a GUI for a first application function and selecting and displaying a GUI for a second application function.

As shown in act 402 of FIG. 4, the application function activation system 106 selects a first application function from a set of application functions for a user account. In some cases, as shown in the act 402, the application function activation system 106 can utilize application function metrics corresponding to the set of application functions to select the first application function (e.g., by selecting an application function from a ranked or ordered set of application functions based on application function metrics and/or utilizing application function metrics to select from the set of application functions based on the corresponding application function metrics). Subsequently, as shown in FIG. 4, the application function activation system 106 provides, for display within a client device 404 corresponding to the user account, a GUI 406 for the first application function.

Indeed, as shown in FIG. 4, the application function activation system 106 displays the GUI 406 with a selectable option 408 to setup the first application function for the user account. In one or more embodiments, upon receiving a user interaction with the selectable option 408, the application function activation system 106 can display one or more GUIs with selectable options to setup the first application function (e.g., first application function setup). For instance, the application function activation system 106 can display one or more GUIs to setup an application function upon receiving a user interaction with the selectable option 408 as described below (e.g., in relation to FIG. 7). In one or more cases, the application function activation system 106 can display one or more GUIs to setup the first application function by providing one or more options to enroll or activate the first application function on the user account (or automatically activate the first application function on the user account) upon receiving a user interaction with the selectable option 408.

As further shown in FIG. 4, the application function activation system 106 displays the GUI 406 with a selectable option 410 to skip the first application function for the user account. In one or more implementations, upon receiving a user interaction with the selectable option 410 (e.g., "skip"), the application function activation system 106 can skip the setup process and/or other access functionality for the first application function on the user account. In one or more instances, the application function activation system 106 selects and displays a subsequent application function GUI upon receiving a user interaction with the selectable option 410 (e.g., "skip").

Furthermore, as shown in FIG. 4, upon receiving one or more user interactions within the GUI 406 for the first application function (e.g., user interactions to activate the first application function or user interactions to skip the first application function), the application function activation system 106 can select and display GUIs for a second application function. In particular, as shown in act 412 of FIG. 4, the application function activation system 106 selects a second application function from the set of application functions for the user account. In some instances, as shown in the act 412, the application function activation system 106 can utilize application function metrics corresponding to the set of application functions to select the second application function (e.g., by selecting a subsequent application function from a ranked or ordered set of application functions based on application function metrics and/or utilizing application function metrics to select from the set of application functions based on the corresponding application function metrics). Moreover, as shown in FIG. 4, the application function activation system 106 provides, for display within the client device 404 corresponding to the user account, a GUI 414 for the second application function.

As shown in FIG. 4, the application function activation system 106 displays the GUI 414 with a selectable option 416 to setup the second application function for the user account. In one or more implementations, upon receiving a user interaction with the selectable option 416, the application function activation system 106 can display one or more GUIs with selectable options to setup the second application function (e.g., second application function setup) as described herein. Moreover, as shown in FIG. 4, the application function activation system 106 displays the GUI 414 with a selectable option 418 to skip the second application function for the user account. In some embodiments, upon receiving a user interaction with the selectable option 418 (e.g., "skip"), the application function activation system 106 can skip the setup process and/or other access functionality for the second application function on the user account.

In one or more instances, the application function activation system 106 selects and displays a subsequent application function GUI upon receiving a user interaction with one or more options in a GUI of an application function (e.g., user interactions to activate the application function or user interactions to skip the application function). In particular, although FIG. 4 illustrates the application function activation system 106 displaying GUIs for two application functions, the application function activation system 106 can continue to display GUIs (e.g., GUIs with setup interfaces and/or access interfaces) for a various number of application functions.

In some implementations, the application function activation system 106 utilizes random selection to select application functions from a set of application functions (to display on a client device of a user account). For example, the application function activation system 106 can randomly select a first application function from the set of application functions and display one or more GUIs for the first application function (in accordance with one or more embodiments herein). Then, upon receiving one or more user interactions with the GUIs of the first application function, the application function activation system 106 can randomly select a second application function from the set of application functions and display one or more GUIs for the second application function. In one or more embodiments, the application function activation system 106 can continue to randomly select various numbers of application functions and display GUIs for the selected application functions.

In some implementations, the application function activation system 106 utilizes application function metrics corresponding to application functions (e.g., application metrics determined as described above) to select the application functions from the set of application functions. In particular, the application function activation system 106 can utilize application function metrics (e.g., one or more of propensity metrics, retention metrics, and/or other application function metrics) to rank and/or order the application functions in the set of application functions (for a particular user account). Then, the application function activation system 106 can select the highest ranked application function from the (pre-ranked and/or pre-ordered) set of application functions as the application function to surface within a GUI of a client device of the user account (e.g., as the first application function). Moreover, the application function activation system 106 can select the subsequent highest (e.g., second highest) application from the set of application functions as the subsequent application function to surface within a GUI of a client device of the user account (e.g., as the second application function). Indeed, the application function activation system 106 can continue to select from the ranked order of application functions to display the application function.

In some embodiments, the application function activation system 106 can select an application function from the set of application functions for a user account by selecting the application function corresponding to the highest application function metrics (for the user account). Indeed, the application function activation system 106 can select a first application function from the set of application functions by selecting an application function that corresponds to the highest application function metrics (e.g., one or more of propensity metrics, retention metrics, and/or other application function metrics). Then, the application function activation system 106 can subsequent application functions by selecting application functions corresponding to the subsequent highest application function metrics (e.g., for a second, third, Nth application function).

Figure 5:
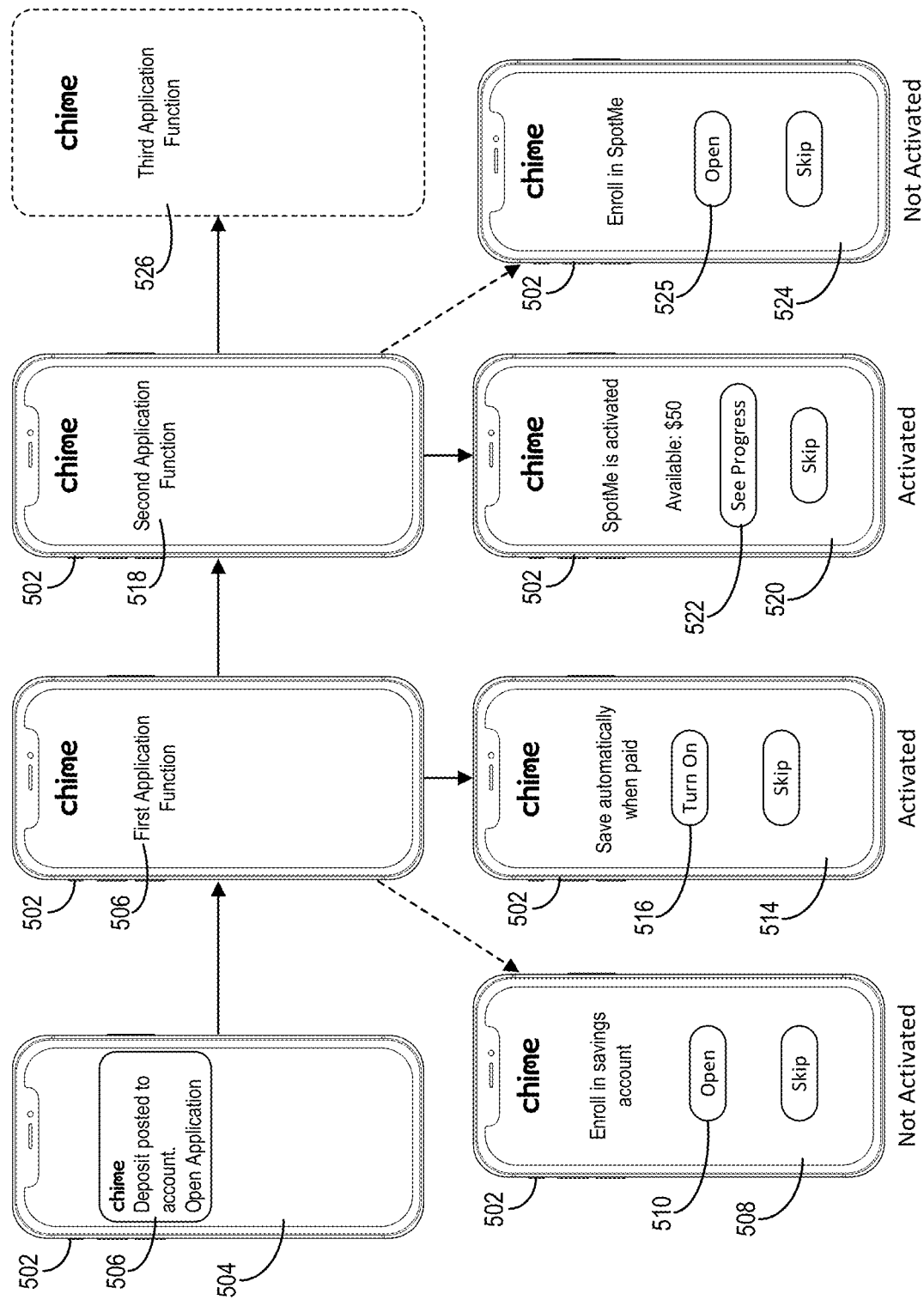
FIG. 5 illustrates a flow diagram of an application function activation system selecting and displaying various (user-specific) application function GUIs of application functions using activation states of the application functions in accordance with one or more implementations.

Furthermore, in one or more embodiments, the application function activation system 106 dynamically surfaces multiple user-specific application function GUIs for setting up (or accessing) application functions for a user account based on activation states of the application functions. For example, FIG. 5 illustrates a flow diagram of the application function activation system 106 selecting and displaying various (user-specific) application function GUIs of application functions for a user account specifically for activation states of the application functions in relation to the user account. In particular, as shown in FIG. 5, the application function activation system 106 determines (or identifies) whether an application function is activated on a user account, selects a GUI for the application function based on the activation status, and displays the GUI for the application function (within a client device of the user account).

As shown in FIG. 5, the application function activation system 106 provides, for display within GUI 504 of a client device 502, a selectable option 505 (e.g., a notification, an application icon) that navigates to a client application of the inter-network facilitation system 104 (e.g., the client application 112). Upon initiating the client application 112, the application function activation system 106 can select (in accordance with one or more embodiments herein) and display GUIs for a first application function 506. As shown in FIG. 5, the application function activation system 106 determines whether the first application function 506 is activated for the user account. As further illustrated in FIG. 5, based on determining that the first application function 506 is activated on the user account, the application function activation system 106 provides, for display within of the client device 502, a GUI 514 for the first application function 506 with selectable options to access (or modify) settings or preferences of the first application function. As shown in FIG. 5, the application function activation system 106 provides, for display within the GUI 514, a selectable option 516 to enable a feature of the first application function (e.g., turn on automatic savings when paid). Indeed, the application function activation system 106 can provide various selectable options to access various features and/or settings of various application functions upon determining that an application function is activated on the user account.

Moreover, as shown in FIG. 5, the application function activation system 106 can (in some cases) determine that the first application function 506 is not activated on the user account. As illustrated in FIG. 5, the application function activation system 106 can, upon determining that the first application function 506 is not activated on the user account, provide, for display within the client device, a GUI 508 to display a setup interface for the first application function 506. Moreover, as shown in FIG. 5, the application function activation system 106 can provide, for display within the GUI 508, a selectable option 510 to initiate (or enroll in) the first application function 506 (e.g., to activate the first application function 506).

Moreover, as shown in FIG. 5, upon receiving a user interaction from the client device 502 with at least one of the selectable options from the GUIs of the first application function 506 (e.g., setting up the first application function 506, skipping the first application function 506, selecting to navigate to the next application function, accessing and/or modifying settings of an activated first application function 506), the application function activation system 106 displays a GUI for a (selected) second application function 518 within the client device 502. As shown in FIG. 5, the application function activation system 106 can select the second application function 518 (as a different application function from the first application function 506).

As further shown in FIG. 5, the application function activation system 106 determines whether the second application function 518 is activated (or not activated) for the user account. As illustrated in FIG. 5, based on determining that the second application function 518 is activated on the user account, the application function activation system 106 provides, for display within of the client device 502, a GUI 520 for the second application function 518 with selectable options to access (or modify) settings or preferences of the second application function 518. For instance, as shown in FIG. 5, the application function activation system 106 provides, for display within the GUI 520, a selectable option 522 to access a feature of the second application function 518 (e.g., see progress on a SpotMe application function).

Furthermore, as shown in FIG. 5, the application function activation system 106 can (in some cases) determine that the second application function 518 is not activated on the user account. As illustrated in FIG. 5, the application function activation system 106 can, upon determining that the second application function is not activated on the user account, provide, for display within the client device 502, a GUI 524 to display a setup interface for the second application function 518. Indeed, as shown in FIG. 5, the application function activation system 106 can provide, for display within the GUI 524, a selectable option 525 to initiate (or enroll in) the second application function 518 (e.g., to activate the second application function 518).

Moreover, in some cases, upon receiving a user interaction from the client device 502 with at least one of the selectable options from the GUIs of the second application function 518 (e.g., setting up the second application function 518, skipping the second application function 518, selecting to navigate to the next application function, accessing and/or modifying settings of an activated second application function 518), the application function activation system 106 displays a GUI for a (selected) third application function 526 within the client device 502. Indeed, the application function activation system 106 can determine activation statuses of the third application function 526 and display various GUIs (as described above) for the third application function 526. Moreover, although one or more embodiments herein illustrate the application function activation system 106 selecting and displaying specific numbers of application functions and application function GUIs, the application function activation system 106 can select and display various numbers of application functions and application function GUIs.

Figure 6A:
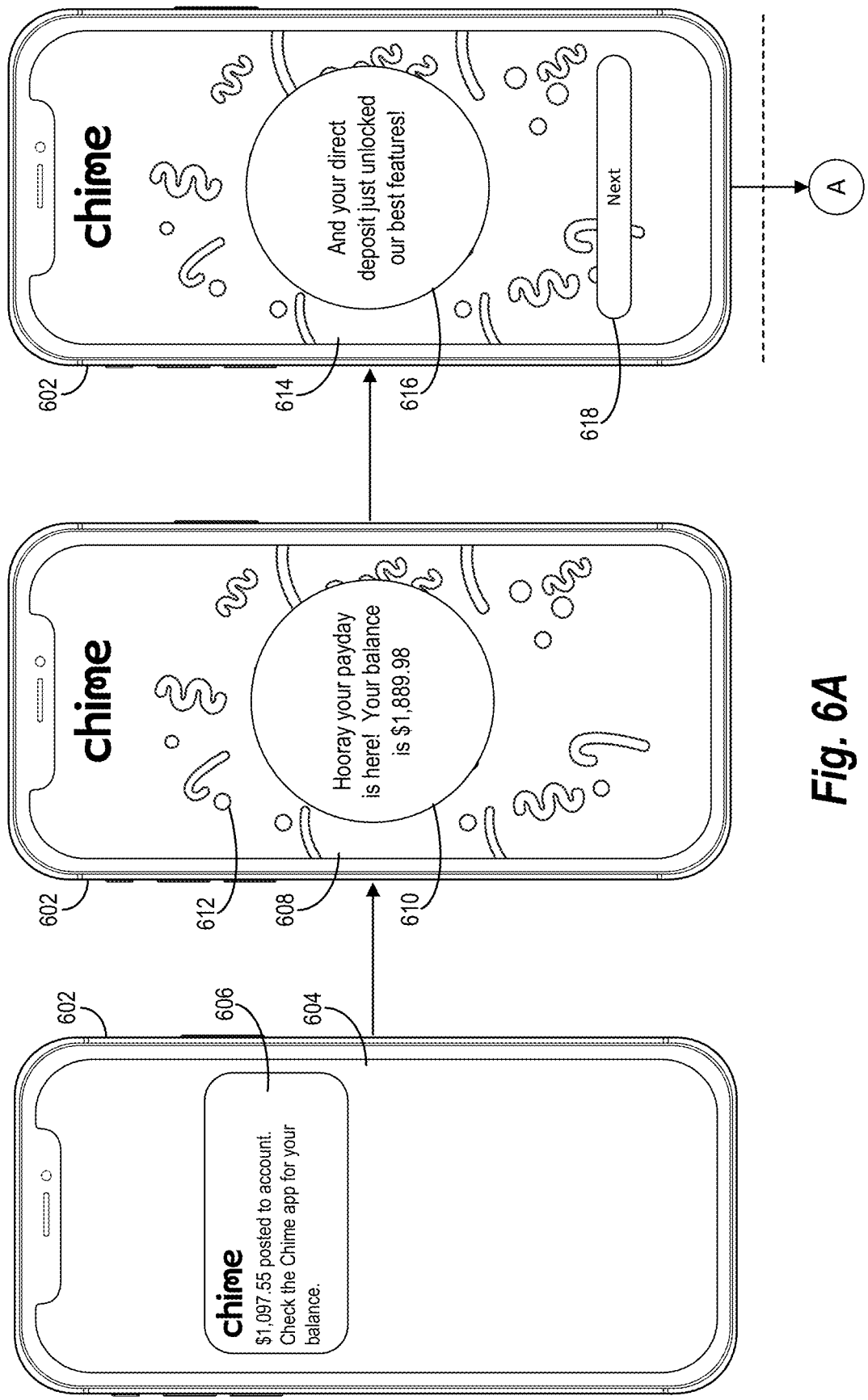
FIGS. 6A and 6B illustrate an exemplary flow of an application function activation system selecting and surfacing a sequence of application function GUIs for a user account in accordance with one or more implementations.
Figure 6B:
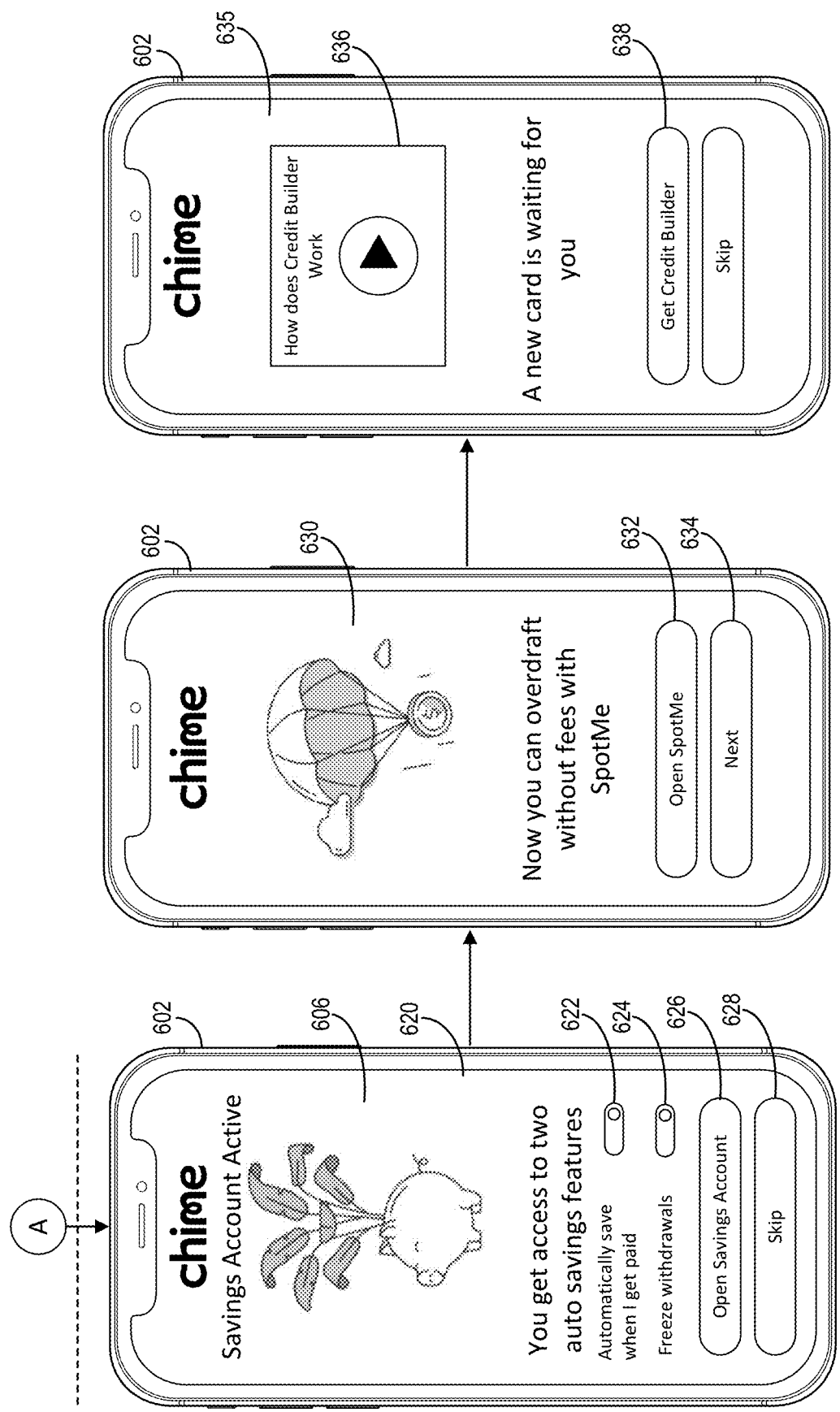

Furthermore, FIGS. 6A and 6B illustrate an exemplary flow of the application function activation system 106 selecting and surfacing a sequence of application function GUIs for a user account (on a client device). For instance, as shown in FIG. 6A, the application function activation system 106 provides, for display within a GUI 604 of a client device 602, a selectable option 606 (e.g., an application notification, an application icon) to open a client application corresponding to the inter-network facilitation system 104 (e.g., the client application 112). Upon receiving a user interaction with the selectable option 606, the application function activation system 106 provides, for display within the client device 602, GUI 608 that indicates a user transaction event indicator 610 that indicates a transaction event that occurred on the user account (e.g., a deposit transaction).

As further shown in FIG. 6A, the application function activation system 106 also provides, for display within the GUI 608, media content 612 (e.g., a video, GIF, image, animation). Indeed, the application function activation system 106 can display the media content 612 as part of the displayed event indicator 610 (e.g., to commemorate or celebrate the event). As further shown in FIG. 6A, the application function activation system 106 provides, for display within a GUI 614, an event indicator 616 to indicate that the user transaction event (e.g., from the event indicator 610) satisfied a requirement to enable one or more application functions for the user account (e.g., unlocked features). In addition, as shown in FIG. 6A, the application function activation system 106 provides, for display within the GUI 614, a selectable option 618 to navigate to one or more selected application function GUIs for the user account.

Moreover, as shown in the transition from FIG. 6A to FIG. 6B, the application function activation system 106 provides, for display within the client device 602, a GUI 620 for a first application function (e.g., a saving account function) upon receiving a user interaction with the selectable option 618 (from the GUI 614 in FIG. 6A). As shown in FIG. 6B, the application function activation system 106 determines that the first application function is already activated for the user account and provides, for display within the GUI 620, selectable options to access and/or modify settings of the first application function. For instance, the application function activation system 106 provides, for display within the GUI 620, a selectable option 622 (e.g., a toggle button) to turn on or off a "automatic saving" feature in the first application function for the user account. Moreover, as shown in FIG. 6B, the application function activation system 106 provides, for display within the GUI 620, a selectable option 624 (e.g., a toggle button) to turn on or off a "freeze withdrawals" feature in the first application function for the user account.

In addition, as shown in FIG. 6B, the application function activation system 106 provides, for display within the GUI 620, a selectable option 626 (e.g., "open saving account") to navigate to one or more additional features of the first application function (e.g., a dedicated UI for the first application function). For example, the application function activation system 106 can, upon receiving a user interaction with the selectable option 626, navigate to a detailed UI for the first application function with access to additional features and information for the first application function. Moreover, as shown in FIG. 6B, the application function activation system 106 provides, for display within the GUI 620, a selectable option 628 to skip the first application function (e.g., to skip the setup process and/or other access functionality for the first application function as described above).

Moreover, as shown in FIG. 6B, upon receiving one or more user interactions within the GUI 620 for the first application function (e.g., user interactions to adjust settings for the first application function or user interactions to skip the first application function), the application function activation system 106 selects and displays a GUI 630 for a second application function (e.g., SpotMe). As shown in FIG. 6B, the application function activation system 106 determines that the second application function is also already activated for the user account and provides, for display within the GUI 630, a selectable option 632 to access the second application function. Indeed, the application function activation system 106 can, upon receiving a user interaction with the selectable option 632, navigate to a detailed UI for the second application function with access to additional features and information for the second application function. Moreover, as shown in FIG. 6B, the application function activation system 106 provides, for display within the GUI 630, a selectable option 634 ("next") to navigate to the next application function GUI.

Moreover, as shown in FIG. 6B, upon receiving one or more user interactions within the GUI 630 for the second application function (e.g., user interactions to access the second application function or user interactions to navigate to the next application function), the application function activation system 106 provides, for display within the client device 602, a GUI 635 for a third application function. As shown in FIG. 6B, the application function activation system 106 determines that the third application function is not activated for the user account and provides, for display within the GUI 635, a setup interface for the third application function (e.g., a setup interface for a credit score application function).

As shown in FIG. 6B, the application function activation system 106 provides, for display within the GUI 635, a selectable option 638 to setup the third application function for the user account. In one or more embodiments, upon receiving a user interaction with the selectable option 638, the application function activation system 106 can display one or more GUIs with selectable options to setup the third application function (e.g., third application function setup). Indeed, the application function activation system 106 can display one or more GUIs with one or more steps to initiate (or enroll into) the third application function.

In some cases, the application function activation system 106 can provide various media content within an application function GUI (e.g., to provide information for features of the application function). For instance, as shown in FIG. 6B, the application function activation system 106 provides, for display on the GUI 635, a video player 636 (e.g., with a video portraying information on the third application function). In one or more embodiments, upon receiving a user interaction on the client device 602 with the video player 636, the application function activation system 106 can playback a video within the GUI 635. Although one or more embodiments herein illustrate a video, the application function activation system 106 can display various media content within a GUI (e.g., images, videos).

In some cases, the application function activation system 106 surfaces the sequence of selected application functions upon determine an initiating user activity. For instance (as shown in FIG. 6A), the application function activation system 106 can identify a user deposit transaction within a user account. Upon identifying the user deposit transaction within the user account, the application function activation system 106 can surface the sequence of selected application functions (in accordance with one or more embodiments herein). Indeed, the application function activation system 106 can utilize various user activities as triggers to surface the sequence of selected application function GUIs (e.g., a deposit transaction, a withdrawal transaction, an enrollment in a specific application function, opening the client application 112).

In certain instances, the application function activation system 106 surfaces the sequence of selected application functions based on a geo-location of a client device corresponding to the user account. For example, the application function activation system 106 can identify a geo-location of a client device of a user account. Upon identifying certain geo-locations (e.g., a home location, a café location, a work location), the application function activation system 106 can surface the sequence of selected application functions (in accordance with one or more embodiments herein). Indeed, the application function activation system 106 can utilize various geo-locations as triggers to surface the sequence of selected application function GUIs (e.g., to increase the likelihood of a user having time to interact with the sequence of selected application function GUIs).

Figure 7:
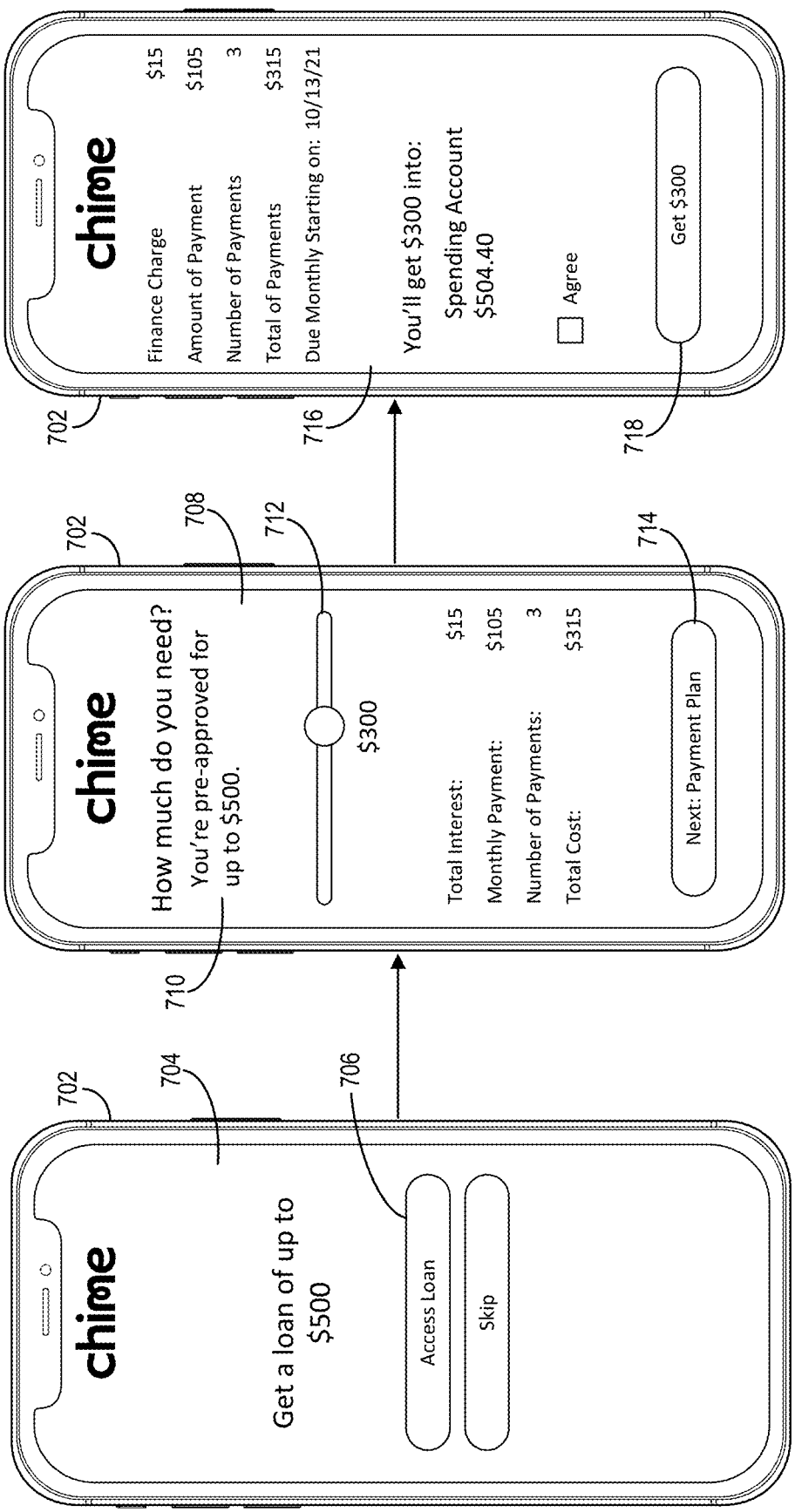
FIG. 7 illustrates an application function activation system displaying GUIs to setup (or access) an application function in accordance with one or more implementations.

As mentioned above, in one or more embodiments, the application function activation system 106 displays one or more GUIs to setup (or access) an application function. For instance, FIG. 7 illustrates the application function activation system 106 displaying one or more GUIs to setup (or access) an application function. In particular, FIG. 7 illustrates the application function activation system 106 displaying one or more GUIs to setup an application function (e.g., a credit value selection application) upon receiving a user interaction with a selectable option to setup or access the application function.

Indeed, as shown in FIG. 7, the application function activation system 106 provides, for display within a client device 702, a GUI 704 for a selected application function (e.g., as part of a sequence of application function GUIs for application functions from a set of application functions for the user account as described above). For instance, as shown in FIG. 7, the application function activation system 106 also provides, for display within the GUI 704, a selectable option 706 to access (or setup) the application function (e.g., "access loan"). Upon receiving a user interaction with the selectable option within the client device 702, the application function activation system 106 can provide, for display within a GUI 708 of the client device 702, a setup interface for features of the application function.

For instance, as shown in FIG. 7, as part of a credit value selection application (e.g., the application function, the application function activation system 106 can provide, for display within the GUI 708 of the client device 702, a credit value range 710 determined by the credit value selection application. Furthermore, as shown in FIG. 7, the application function activation system 106 can provide, for display within the GUI 708, selectable credit values 712 (e.g., a slider tool) to select a credit value from the determined credit value range 710. As further shown in FIG. 7, the application function activation system 106 can provide, for display within the GUI 708, a selectable option 714 to confirm a selected credit value. As further shown in FIG. 7, upon receiving a selection of the credit value from the selectable credit values 712, the application function activation system 106 provides, for display within the GUI 716, dynamic credit value conditions for the selected credit value (in accordance with one or more embodiments). In addition, the application function activation system 106 can provide, for display within the GUI 716, a selectable option 718 to confirm a selected credit value. Indeed, upon receiving a user interaction with the selectable option 718, the application function activation system 106 can modify a user account value using the selected credit value (e.g., deposit the selected credit value within the user account).

In addition, upon completion of the setup or access to the application function within the GUI 708 and the GUI 716, the application function activation system 106 can select a subsequent application function from the set of application functions to display one or more GUIs to setup or access the subsequent application function (in accordance with one or more implementations herein). Indeed, the application function activation system 106 can select and display various application function setup or access interfaces in accordance with one or more implementations herein. Furthermore, although FIG. 7 illustrates a setup (or access) interface for a specific application function (e.g., a credit value selection application), the application function activation system 106 can display setup (or access) interfaces with various features for various application functions (e.g., a base limit value utilization application, a user risk assessment value application, an automatic user account value allocation application, or a user account value transfer application).

Figure 8:
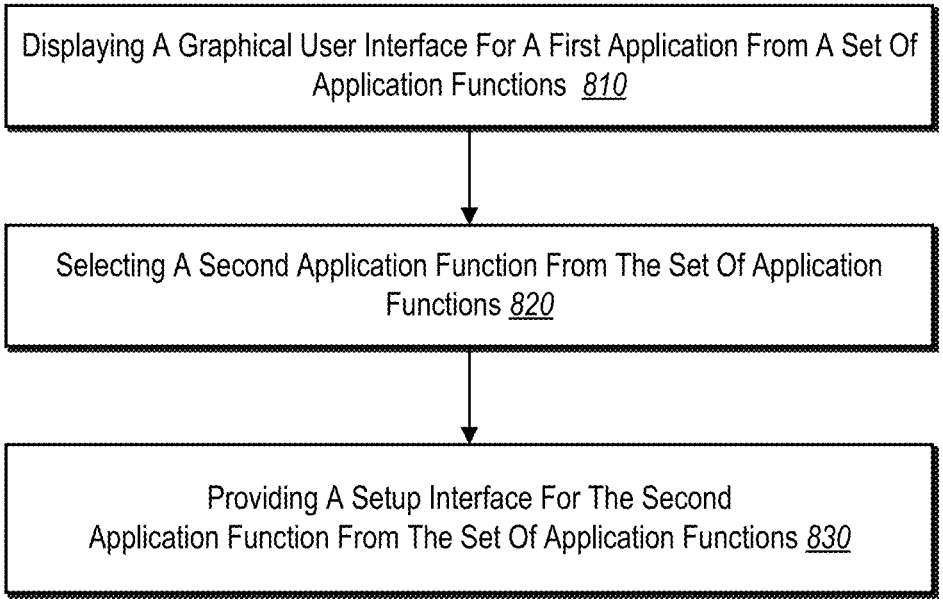
FIG. 8 illustrates a flowchart of series of acts for dynamically selecting and displaying multiple user-specific application function GUIs to setup and/or access application functions in accordance with one or more implementations.

Turning now to FIG. 8, this figure shows a flowchart of a series of acts 800 dynamically selecting and displaying multiple user-specific application function GUIs to setup and/or access application functions in accordance with one or more implementations. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by the one or more processors, cause a computing device to perform the acts depicted in FIG. 8. In still further embodiments, a system can perform the acts of FIG. 8.

As shown in FIG. 8, the series of acts 800 include an act 810 displaying a graphical user interface for a first application from a set of application functions. For example, the act 810 can include identifying, for a user account, a set of application functions corresponding to a system application. In addition, the act 810 can include providing, for display within a client device corresponding to a user account, a graphical user interface for a first application function from a set of application functions. In some instances, the act 810 includes providing a graphical user interface for a first application function from a set of application functions including one or more selectable options to setup the first application function for a user account. For example, an application function can include a base limit value utilization application, a user risk assessment value application, a credit value selection application, an automatic user account value allocation application, or a user account value transfer application.

In one or more implementations, the act 810 can include identifying a set of application functions by ordering application functions within the set of application functions based on application function metrics (e.g., propensity metrics or retention metrics) corresponding to application functions (within the set of application functions).

Additionally, the act 810 can include identifying a first application function is activated for a user account. In some embodiments, the act 810 includes identifying a first application function is activated for a user account by activating the first application function for the user account based on user interactions with a graphical user interface. Moreover, the act 810 can include identifying a first application function is activated for a user account by determining the first application function is currently or previously activated for the user account. Additionally, the act 810 can include providing, for display within a client device corresponding to a user account, a graphical user interface for a first application function that includes an indication that the first application function is activated on the user account and a selectable option to navigate to a setup interface for a second application function from a set of application functions.

In some cases, the act 810 includes detecting a deposit transaction corresponding to a user account. In addition, the act 810 can include, based on detecting a deposit transaction, providing, for display within a client device corresponding to a user account, a graphical user interface for a first application function and a setup interface for the second application function.

As also shown in FIG. 8, the series of acts 800 include an act 820 of selecting a second application function from the set of application functions. For instance, the act 820 can include selecting a second application function from a set of application functions. For instance, the act 820 can include selecting a second application function from a set of application functions based on receiving user interactions with a graphical user interface for a first application function and identifying the first application function is activated. In some cases, the act 820 can include randomly selecting a first application function (or a second application function) from a set of application functions.

In one or more implementations, the act 820 includes utilizing an application activation propensity model with user activity data to determine propensity metrics for application functions in a set of application functions that represent likelihoods of the application functions being activated on the user account. In one or more embodiments, the act 820 includes utilizing an application activation propensity model with user activity data to determine a propensity metric for a second application function from a set of application functions. For instance, a propensity metric can represent a likelihood of a second application function being activated on a user account. Furthermore, the act 820 can include selecting a second application function from a set of application functions based on a propensity metric (or based on propensity metrics for application functions in a set of application functions). Furthermore, user activity data can include transaction activity data of a user account, utilization of one or more application functions, or user activity duration.

Moreover, the act 820 can include utilizing a user account retention model with user activity data to determine retention metrics for application functions in a set of application functions that represent likelihoods of the user account remaining active after activating the application functions on the user account. In addition, the act 820 can include utilizing a user account retention model with user activity data to determine a retention metric for a second application function from a set of application functions. For instance, a retention metric can represent a likelihood of a user account remaining active after activating a second application function on a user account. Moreover, the act 820 can include selecting a second application function from a set of application functions based on a retention metric (or based on retention metrics for application functions in the set of application functions).

As shown in FIG. 8, the series of acts 800 include an act 830 of providing a setup interface for the second application function from the set of application functions. For example, the act 830 can include providing, for display on a client device corresponding to a user account, a setup interface for a second application function from a set of application functions. Furthermore, the act 830 can include providing, for display on a client device corresponding to a user account, a setup interface for a second application function from a set of application functions based on identifying a first application function is activated (and/or receiving user interactions with a graphical user interface for a first application function).

Additionally, the act 830 can include providing a setup interface for a second application function by providing one or more selectable options to activate the second application function on a user account. In addition, the act 830 can include receiving a user interaction with a selectable skip option within a setup interface for a second application function. In one or more embodiments, the act 830 can include, based on receiving a user interaction with a selectable skip option, selecting a third application function from a set of application functions and providing, for display on a client device corresponding to a user account, an additional setup interface for a third application function from the set of application functions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
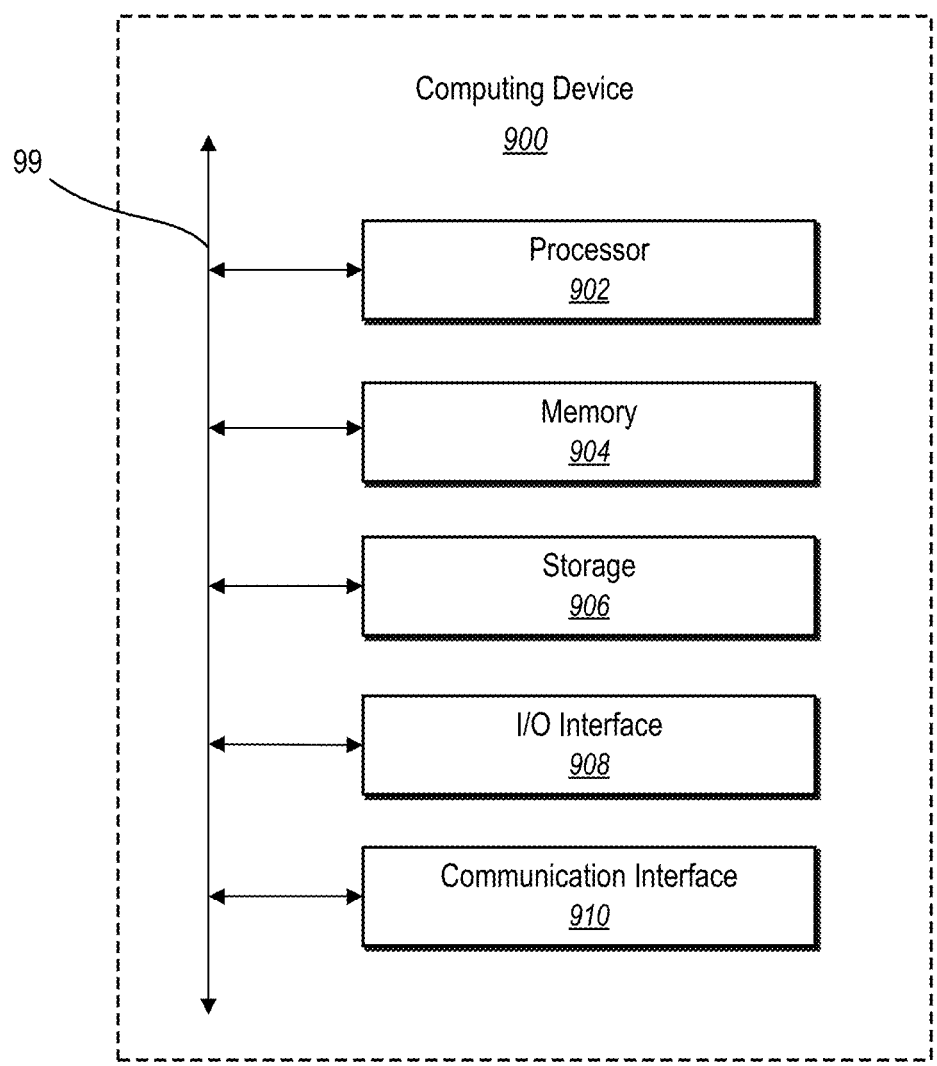
FIG. 9 illustrates a block diagram of an exemplary computing device in accordance with one or more implementations.

FIG. 9 illustrates, in block diagram form, an exemplary computing device 900 that may be configured to perform one or more of the processes described above. One will appreciate that the application function activation system 106 (or the inter-network facilitation system 104) can comprise implementations of a computing device, including, but not limited to, the devices or systems illustrated in the previous figures. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive ("HDD"), flash memory, a Universal Serial Bus ("USB") drive or a combination of these or other storage devices.

The computing device 900 also includes one or more input or output ("I/O") interface 908, which are provided to allow a user (e.g., requester or provider) to provide input to (such as user strokes), receive output from, and otherwise transfer data to and from the computing device 900. These I/O interface 908 may include a mouse, keypad or a keyboard, a touch screen, camera, optical scanner, network interface, modem, other known I/O devices or a combination of such I/O interface 908. The touch screen may be activated with a stylus or a finger.

The I/O interface 908 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can comprise hardware, software, or both that couples components of computing device 900 to each other.

Figure 10:
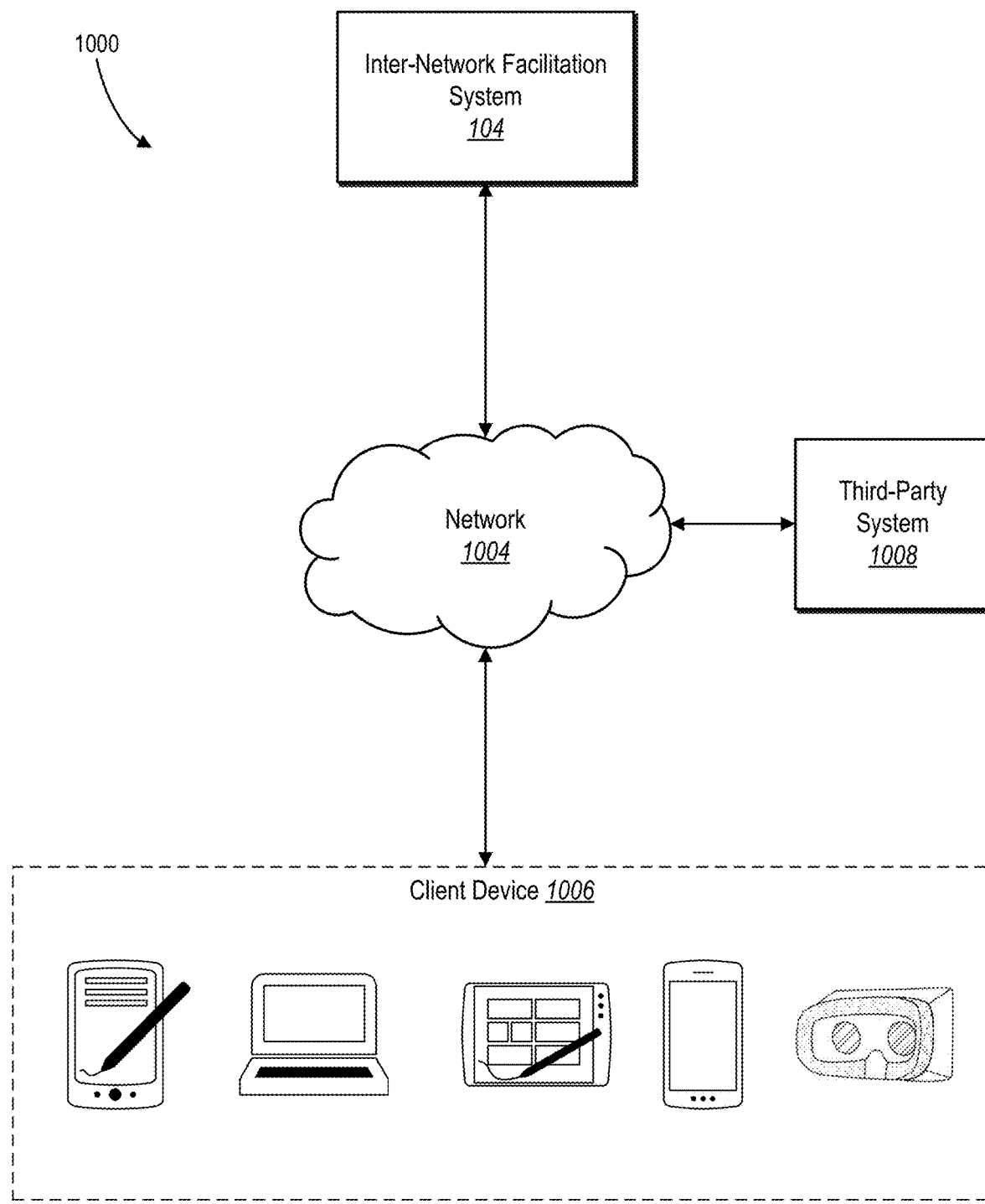
FIG. 10 illustrates an example environment for an inter-network facilitation system in accordance with one or more implementations.

FIG. 10 illustrates an example network environment 1000 of the inter-network facilitation system 104. The network environment 1000 includes a client device 1006 (e.g., client device 110), an inter-network facilitation system 104, and a third-party system 1008 connected to each other by a network 1004. Although FIG. 10 illustrates a particular arrangement of the client device 1006, the inter-network facilitation system 104, the third-party system 1008, and the network 1004, this disclosure contemplates any suitable arrangement of client device 1006, the inter-network facilitation system 104, the third-party system 1008, and the network 1004. As an example, and not by way of limitation, two or more of client device 1006, the inter-network facilitation system 104, and the third-party system 1008 communicate directly, bypassing network 1004. As another example, two or more of client device 1006, the inter-network facilitation system 104, and the third-party system 1008 may be physically or logically co-located with each other in whole or in part.

Moreover, although FIG. 10 illustrates a particular number of client devices 1006, inter-network facilitation system 104, third-party systems 1008, and networks 1004, this disclosure contemplates any suitable number of client devices 1006, FIG. 10, third-party systems 1008, and networks 1004. As an example, and not by way of limitation, network environment 1000 may include multiple client devices 1006, inter-network facilitation system 104, third-party systems 1008, and/or networks 1004.

This disclosure contemplates any suitable network 1004. As an example, and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006, inter-network facilitation system 104 (e.g., which hosts the application function activation system 106), and third-party system 1008 to network 1004 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by client device 1006. As an example, and not by way of limitation, a client device 1006 may include any of the computing devices discussed above in relation to FIG. 9. A client device 1006 may enable a network user at the client device 1006 to access network 1004. A client device 1006 may enable its user to communicate with other users at other client devices 1006.

In particular embodiments, the client device 1006 may include a requester application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the client device 1006 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1006 one or more Hyper Text Markup Language ("HTML") files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1004) to link the third-party-system 1008. For example, the inter-network facilitation system 104 may receive authentication credentials from a user to link a third-party system 1008 such as an online bank account, credit account, debit account, or other financial account to a user account within the inter-network facilitation system 104. The inter-network facilitation system 104 can subsequently communicate with the third-party system 1008 to detect or identify balances, transactions, withdrawal, transfers, deposits, credits, debits, or other transaction types associated with the third-party system 1008. The inter-network facilitation system 104 can further provide the aforementioned or other financial information associated with the third-party system 1008 for display via the client device 1006. In some cases, the inter-network facilitation system 104 links more than one third-party system 1008, receiving account information for accounts associated with each respective third-party system 1008 and performing operations or transactions between the different systems via authorized network connections.

In particular embodiments, the inter-network facilitation system 104 may interface between an online banking system and a credit processing system via the network 1004. For example, the inter-network facilitation system 104 can provide access to a bank account of a third-party system 1008 and linked to a user account within the inter-network facilitation system 104. Indeed, the inter-network facilitation system 104 can facilitate access to, and transactions to and from, the bank account of the third-party system 1008 via a client application of the inter-network facilitation system 104 on the client device 1006. The inter-network facilitation system 104 can also communicate with a credit processing system, an ATM system, and/or other financial systems (e.g., via the network 1004) to authorize and process credit charges to a credit account, perform ATM transactions, perform transfers (or other transactions) across accounts of different third-party systems 1008, and to present corresponding information via the client device 1006.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1008), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1000 either directly or via network 1004. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or an inter-network facilitation system 104 to manage, retrieve, modify, add, or delete, the information stored in a data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1004.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1006. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from client device 1006 responsive to a request received from client device 1006. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1006 associated with users.

In addition, the third-party system 1008 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1004. A third-party system 1008 can communicate with the inter-network facilitation system 104 to provide financial information pertaining to balances, transactions, and other information, whereupon the inter-network facilitation system 104 can provide corresponding information for display via the client device 1006. In particular embodiments, a third-party system 1008 communicates with the inter-network facilitation system 104 to update account balances, transaction histories, credit usage, and other internal information of the inter-network facilitation system 104 and/or the third-party system 1008 based on user interaction with the inter-network facilitation system 104 (e.g., via the client device 1006). Indeed, the inter-network facilitation system 104 can synchronize information across one or more third-party systems 1008 to reflect accurate account information (e.g., balances, transactions, etc.) across one or more networked systems, including instances where a transaction (e.g., a transfer) from one third-party system 1008 affects another third-party system 1008.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
identifying, for a user account, a set of application functions corresponding to a system application;
providing, for display within a client device corresponding to the user account, a first graphical user setup interface to activate a first application function from the set of application functions for the user account;
based on receiving user interactions with the first graphical user setup interface, activating the first application function for the user account to provide access to electronic services corresponding to the first application function within the system application to the user account;
based on identifying the first application function is activated:
utilizing an application activation propensity model with user activity data of the user account to select a second application function from the set of application functions for the user account based on a predicted propensity to setup the second application function; and
causing the client device to automatically navigate from the first graphical user setup interface to a second graphical user setup interface to display selectable setup options for the selected second application function from the set of application functions;
receiving a user interaction with a selectable skip option within the second graphical user setup interface for the second application function; and
based on receiving the user interaction with the selectable skip option:
selecting a third application function from the set of application functions; and
providing, for display on the client device corresponding to the user account, a third graphical user setup interface for a third application function from the set of application functions.

2. The computer-implemented method of claim 1, further comprising:
utilizing the application activation propensity model with the user activity data to determine propensity metrics for application functions in the set of application functions that represent likelihoods of the application functions being activated on the user account; and
selecting the second application function from the set of application functions based on the propensity metrics for the application functions in the set of application functions.

3. The computer-implemented method of claim 1, further comprising:
utilizing a user account retention model with the user activity data to determine retention metrics for application functions in the set of application functions that represent likelihoods of the user account remaining active after activating the application functions on the user account; and
selecting the second application function from the set of application functions based on the retention metrics for the application functions in the set of application functions.

4. The computer-implemented method of claim 2, wherein the user activity data comprises transaction activity data of the user account, utilization of one or more application functions, or a user activity duration.

5. The computer-implemented method of claim 1, further comprising providing, for display within the client device corresponding to the user account, the first graphical user setup interface to activate the first application function by selecting the first application function based on propensity metrics corresponding to the first application function from the application activation propensity model.

6. The computer-implemented method of claim 5, further comprising selecting the first application function based on retention metrics corresponding to the first application function from a user account retention model.

7. The computer-implemented method of claim 1, further comprising providing, for display within the first graphical user setup interface for the first application function from the set of application functions, one or more selectable options to setup the first application function for the user account.

8. The computer-implemented method of claim 1, further comprising providing, for display within the client device corresponding to the user account, the first graphical user setup interface for the first application function comprising:
an indication that the first application function is activated on the user account; and
a selectable option to navigate to the second graphical user setup interface for the second application function from the set of application functions.

9. The computer-implemented method of claim 1, wherein providing the second graphical user setup interface for the second application function comprises providing, for display within the second graphical user setup interface, one or more selectable options to activate additional electronic services for the second application function on the user account.

10. The computer-implemented method of claim 1, further comprising providing, for display within the third graphical user setup interface, one or more selectable options to activate additional electronic services for the third application function on the user account.

11. The computer-implemented method of claim 1, wherein the set of application functions comprise a base limit value utilization application, a user risk assessment value application, a credit value selection application, an automatic user account value allocation application, or a user account value transfer application.

12. A non-transitory computer-readable medium storing instructions that, when executed by at least one processor, cause a computing device to:
identify, for a user account, a set of application functions corresponding to a system application;
provide, for display within a client device corresponding to the user account, a first graphical user setup interface to activate a first application function from the set of application functions for the user account;
based on receiving user interactions with the first graphical user setup interface, activating the first application function for the user account to provide access to electronic services corresponding to the first application function within the system application to the user account;
based on identifying the first application function is activated:
utilize an application activation propensity model with user activity data of the user account to select a second application function from the set of application functions for the user account based on a predicted propensity to setup the second application function; and
cause the client device to automatically navigate from the first graphical user setup interface to a second graphical user setup interface to display selectable setup options for the selected second application function from the set of application functions;
receive a user interaction with a selectable skip option within the second graphical user setup interface for the second application function; and
based on receiving the user interaction with the selectable skip option:
select a third application function from the set of application functions; and
provide, for display on the client device corresponding to the user account, a third graphical user setup interface for a third application function from the set of application functions.

13. The non-transitory computer-readable medium of claim 12, further comprising instructions that, when executed by the at least one processor, cause the computing device to:
utilize the application activation propensity model with the user activity data to determine propensity metrics for application functions in the set of application functions that represent likelihoods of the application functions being activated on the user account, wherein the user activity data comprises transaction activity data of the user account, utilization of one or more application functions, or a user activity duration; and
select the second application function from the set of application functions based on the propensity metrics for the application functions in the set of application functions.

14. The non-transitory computer-readable medium of claim 12, further comprising instructions that, when executed by the at least one processor, cause the computing device to:
utilize a user account retention model with the user activity data to determine retention metrics for application functions in the set of application functions that represent likelihoods of the user account remaining active after activating the application functions on the user account, wherein the user activity data comprises transaction activity data of the user account, utilization of one or more application functions, or a user activity duration; and
select the second application function from the set of application functions based on the retention metrics for the application functions in the set of application functions.

15. The non-transitory computer-readable medium of claim 13, wherein identifying the set of application functions comprises ordering the application functions within the set of application functions based on the propensity metrics corresponding to the application functions.

16. The non-transitory computer-readable medium of claim 12, further comprising instructions that, when executed by the at least one processor, cause the computing device to provide, for display within the first graphical user setup interface for the first application function from the set of application functions, one or more selectable options to setup the first application function for the user account.

17. A system comprising:
at least one processor; and
at least one non-transitory computer-readable storage medium storing instructions that, when executed by the at least one processor, cause the system to:
identify, for a user account, a set of application functions corresponding to a system application;
provide, for display within a client device corresponding to the user account, a first graphical user setup interface to activate a first application function from the set of application functions for the user account;
based on receiving user interactions with the first graphical user setup interface, activating the first application function for the user account to provide access to electronic services corresponding to the first application function within the system application to the user account;
based on identifying the first application function is activated:
utilize an application activation propensity model with user activity data of the user account to select a second application function from the set of application functions for the user account based on a predicted propensity to setup the second application function; and
cause the client device to automatically navigate from the first graphical user setup interface to a second graphical user setup interface to display selectable setup options for the selected second application function from the set of application functions;
receive a user interaction with a selectable skip option within the second graphical user setup interface for the second application function; and
based on receiving the user interaction with the selectable skip option:
select a third application function from the set of application functions; and
provide, for display on the client device corresponding to the user account, a third graphical user setup interface for a third application function from the set of application functions.

18. The system of claim 17, further comprising instructions that, when executed by the at least one processor, cause the system to provide, for display within the client device corresponding to the user account, the first graphical user setup interface to activate the first application function by selecting the first application function based on propensity metrics corresponding to the first application function from the application activation propensity model.

19. The system of claim 17, further comprising instructions that, when executed by the at least one processor, cause the system to provide, for display within the second graphical user setup interface, one or more selectable options to activate additional electronic services for the second application function on the user account.

20. The system of claim 17, further comprising instructions that, when executed by the at least one processor, cause the system to identify the set of application functions comprises ordering application functions within the set of application functions based on propensity metrics corresponding to the application functions from the application activation propensity model.

* * * * *